United States Patent
Filippov et al.

(10) Patent No.: US 11,689,729 B2
(45) Date of Patent: Jun. 27, 2023

(54) METHOD AND APPARATUS FOR VIDEO INTRA PREDICTION INVOLVING FILTERING REFERENCE SAMPLES BASED ON WIDE-ANGLE MODE

(71) Applicant: HUAWEI TECHNOLOGIES CO., LTD., Shenzhen (CN)

(72) Inventors: Alexey Konstantinovich Filippov, Moscow (RU); Vasily Alexeevich Rufitskiy, Moscow (RU); Jianle Chen, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/142,185

(22) Filed: Jan. 5, 2021

(65) Prior Publication Data
US 2021/0127122 A1    Apr. 29, 2021

Related U.S. Application Data

(63) Continuation of application No. PCT/RU2019/050214, filed on Nov. 14, 2019.
(Continued)

(51) Int. Cl.
*H04N 19/159* (2014.01)
*H04N 19/103* (2014.01)
(Continued)

(52) U.S. Cl.
CPC ......... *H04N 19/159* (2014.11); *H04N 19/103* (2014.11); *H04N 19/105* (2014.11);
(Continued)

(58) Field of Classification Search
CPC .. H04N 19/103; H04N 19/105; H04N 19/117; H04N 19/119; H04N 19/159; H04N 19/176; H04N 19/593; H04N 19/80
See application file for complete search history.

(56) References Cited

U.S. PATENT DOCUMENTS

| | | |
|---|---|---|
| 9,451,254 B2 | 9/2016 | Joshi et al. |
| 2015/0023405 A1 | 1/2015 | Joshi et al. |

(Continued)

FOREIGN PATENT DOCUMENTS

| | | | |
|---|---|---|---|
| CA | 3048115 C | 11/2021 | |
| EP | 3627836 A1 * | 3/2020 | ........... H04N 19/159 |

(Continued)

OTHER PUBLICATIONS

Racape (Technicolor) F et al: "CE3-related: Wide-angle intra predictionfor non-square blocks", 11. JVET Meeting; Jul. 11, 2018-Jul. 18, 2018;Ljubljana; (The Joint Video Exploration Team of ISO/IEC JTC1/SC29/WG11 and ITU-T SG.16 ), No. JVET-K0500_r4, 13 pages.
(Continued)

*Primary Examiner* — Francis Geroleo
(74) *Attorney, Agent, or Firm* — Gregg L. Jansen

(57) ABSTRACT

A method of intra prediction of a block in a picture of a video is provided. The method includes obtaining an intra prediction mode of the block; determining whether the intra prediction mode of the block is a wide-angle mode; filtering reference samples for the block based, at least in part, upon determining that the intra prediction mode of the block is the wide-angle mode; and generating predicted samples of the block based on filtered reference samples.

18 Claims, 15 Drawing Sheets

Related U.S. Application Data

(60) Provisional application No. 62/767,496, filed on Nov. 14, 2018.

(51) Int. Cl.
| | |
|---|---|
| *H04N 19/105* | (2014.01) |
| *H04N 19/117* | (2014.01) |
| *H04N 19/176* | (2014.01) |
| *H04N 19/593* | (2014.01) |
| *H04N 19/80* | (2014.01) |

(52) U.S. Cl.
CPC ......... *H04N 19/117* (2014.11); *H04N 19/176* (2014.11); *H04N 19/593* (2014.11); *H04N 19/80* (2014.11)

(56) References Cited

U.S. PATENT DOCUMENTS

| | | | |
|---|---|---|---|
| 2020/0021817 A1* | 1/2020 | Van der Auwera | H04N 19/11 |
| 2020/0084443 A1* | 3/2020 | Zhao | G06T 5/003 |
| 2020/0137381 A1* | 4/2020 | Van der Auwera | H04N 19/59 |
| 2020/0374530 A1* | 11/2020 | Racape | H04N 19/105 |

FOREIGN PATENT DOCUMENTS

| | | |
|---|---|---|
| JP | 2016530779 A | 9/2016 |
| WO | 2017088813 A1 | 6/2017 |
| WO | 2018132380 A1 | 7/2018 |
| WO | 2020086985 A1 | 4/2020 |

OTHER PUBLICATIONS

Benjamin Brass et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-V2, total 168 pages.

Alexey Filippov et al,CE3-related: Reference sample processing for wide-angle intra-prediction. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0059-v1, 4 pages.

Document: JVET-A1001, Jianle Chen et al, Algorithm Description of Joint Exploration Test Model 1, Joint Video Exploration Team (JVET) of ITU-T SG 16 WP 3 and ISO/IEC JTC 1/SC 29/WG 11, 1nd Meeting: Geneva, CH, Oct. 19-21, 2015, 27 pages.

* cited by examiner (A) Horizontal orientation    (B) Vertical orientation

METHOD AND APPARATUS FOR VIDEO INTRA PREDICTION INVOLVING FILTERING REFERENCE SAMPLES BASED ON WIDE-ANGLE MODE

CROSS-REFERENCE TO RELATED APPLICATIONS

This application is a continuation of International Application No. PCT/RU2019/050214, filed on Nov. 14, 2019, which claims the benefit of U.S. Provisional Application No. 62/767,496, filed on Nov. 14, 2018. The disclosures of the aforementioned applications are hereby incorporated by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of DVD-discs. Before transmission, the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depends on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes.

The intra prediction scheme is considered complex.

SUMMARY

Apparatus and method for intra prediction are disclosed.

According to a first aspect, the disclosure relates to a method for intra prediction of a current image block in a current picture of a video, the method includes: obtaining an intra prediction mode of the block; and obtaining predicted samples of the block based on filtered reference samples when the intra prediction mode of the block is a wide-angle mode.

In a possible implementation form of the method according to the first aspect, the intra prediction mode for the block is an integer slope wide-angle mode. The integer slope wide-angle mode is at least one of: −14, −12, −10, −6, 72, 76, 78, 80.

The first aspect is aimed at unification of reference sample processing for with the combination of an output of directional prediction and additional prediction signal used to improve visual quality of predicted block. The result of this unification is that reference samples are processed only once, and the result of this processing is reused by both directional intra prediction process and generating additional prediction. For example, filtered reference samples are used for wide-angle mode, thus only one filtered reference sample buffer is needed.

The following steps may be performed to implement the intra prediction method:

Step 1: Perform reference sample filtering based on reference samples, intra prediction mode intraPredMode and/or block dimensions (width and height).

Step 2: Perform directional intra prediction based on the processed (filtered or unfiltered reference samples) reference samples (results of step 1) in accordance with intraPredAngle.

Step 3: Update the result obtained at step 2 with prediction combination, which could be Position-Dependent Prediction Combination (PDPC), or Simplified PDPC, where input reference samples used in step 3 are the same as reference samples obtained at step 1 and used in step 2 for integer slope wide-angle modes (e.g. −14, −12, −10, −6, 72, 76, 78, 80 as specified in below Tables X and Y).

Optionally, based on predModeIntra, determine whether filtered or unfiltered reference sample buffer should be used. This could be performed by applying one of the filters listed in below Table 5. In VVC, filters with indices 0 and 1 are used.

Reference samples are filtered (filter index "1" in Table 5 is used) in case when predMode is equal to 2, 34 or 66 and when nTbS>2.

Alternative embodiment of the above described method is to use the angle parameter (denoted further as intraPredAngle) at this step instead of intra prediction mode predModeIntra. In this case, reference samples are filtered (filter index "1" of Table 5 is used) if the value of intraPredAngle is a multiple of 32 and when nTbS>2.

The method according to the first aspect of the disclosure can be performed by the apparatus according to the second aspect of the disclosure. For example, the apparatus may include an obtaining unit and a wide-angle prediction unit. The obtaining unit, configured to obtain an intra prediction mode of the block; and the wide-angle prediction unit, configured to obtain predicted samples of the block based on filtered reference samples when the intra prediction mode of the block is a wide-angle mode.

Further features and implementation forms of the method according to the second aspect of the disclosure correspond to the features and implementation forms of the apparatus according to the first aspect of the disclosure.

The advantages of the apparatus according to the second aspect are the same as those for the corresponding implementation forms of the method according to the first aspect.

According to a third aspect the disclosure relates to an apparatus for decoding a video stream includes a processor and a memory. The memory is storing instructions that cause the processor to perform the method according to the first aspect.

According to a fourth aspect the disclosure relates to an apparatus for encoding a video stream includes a processor and a memory. The memory is storing instructions that cause the processor to perform the method according to the first aspect.

According to a fifth aspect, a computer-readable storage medium having stored thereon instructions that when executed cause one or more processors configured to code video data is proposed. The instructions cause the one or more processors to perform a method according to the first aspect or any possible embodiment of the first aspect.

According to a sixth aspect, the disclosure relates to a computer program comprising program code for performing the method according to the first aspect or any possible embodiment of the first aspect when executed on a computer.

Details of one or more embodiments are set forth in the accompanying drawings and the description below. Other features, objects, and advantages will be apparent from the description, drawings, and claims.

BRIEF DESCRIPTION OF DRAWINGS

The following embodiments are described in more detail with reference to the attached figures and drawings, in which:

FIG. 20 shows usage of different interpolation filters depending on which side the reference samples being used belong to.

DETAILED DESCRIPTION OF EMBODIMENTS

Definitions of Acronyms & Glossary

Figure 1:
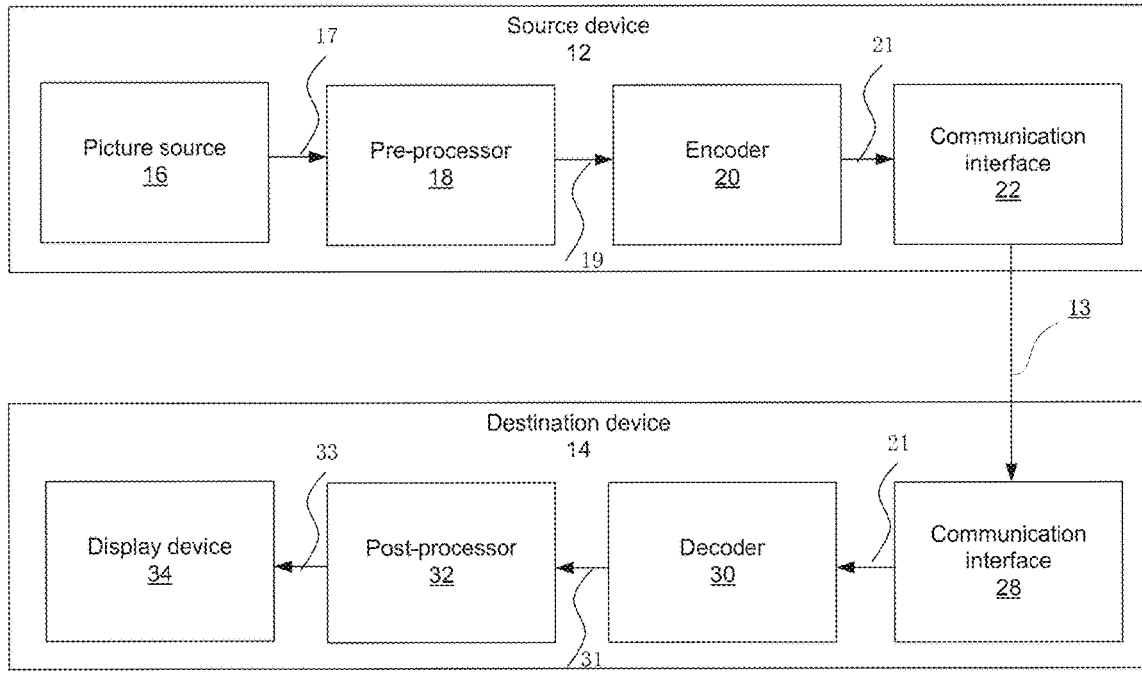
FIG. 1 is a block diagram showing an example of a video coding system configured to implement embodiments of the invention.

JEM Joint Exploration Model (the software codebase for future video coding exploration)
JVET Joint Video Experts Team
LUT Look-Up Table
PDPC Position-Dependent Prediction Combination
QT QuadTree
QTBT QuadTree plus Binary Tree
RDO Rate-distortion Optimization
ROM Read-Only Memory
VTM VVC Test Model
VVC Versatile Video Coding, the standardization project developed by JVET.
  CTU/CTB—Coding Tree Unit/Coding Tree Block
  CU/CB—Coding Unit/Coding Block
  PU/PB—Prediction Unit/Prediction Block
  TU/TB—Transform Unit/Transform Block
  HEVC—High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) uses 35 Intra modes whereas the BMS (Benchmark Set) uses 67 Intra modes. Intra prediction is a mechanism used in many video coding frameworks to increase compression efficiency in the cases where only a given frame can be involved.

FIG. 1 is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
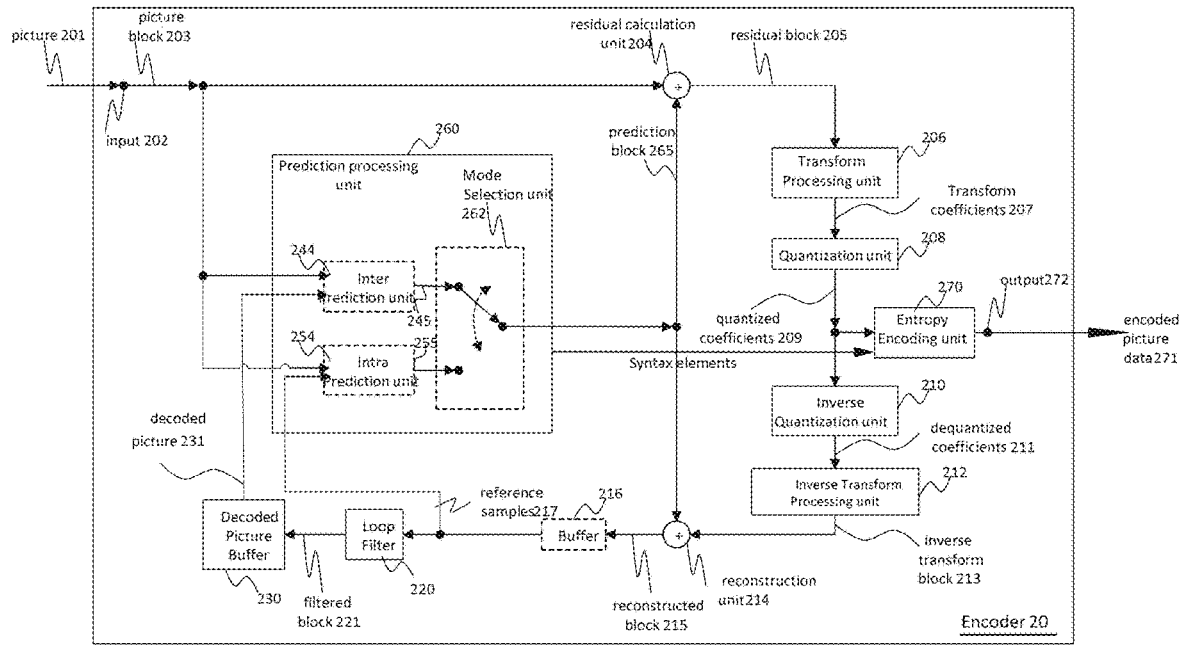
FIG. 2 is a block diagram showing an example of a video encoder configured to implement embodiments of the invention.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
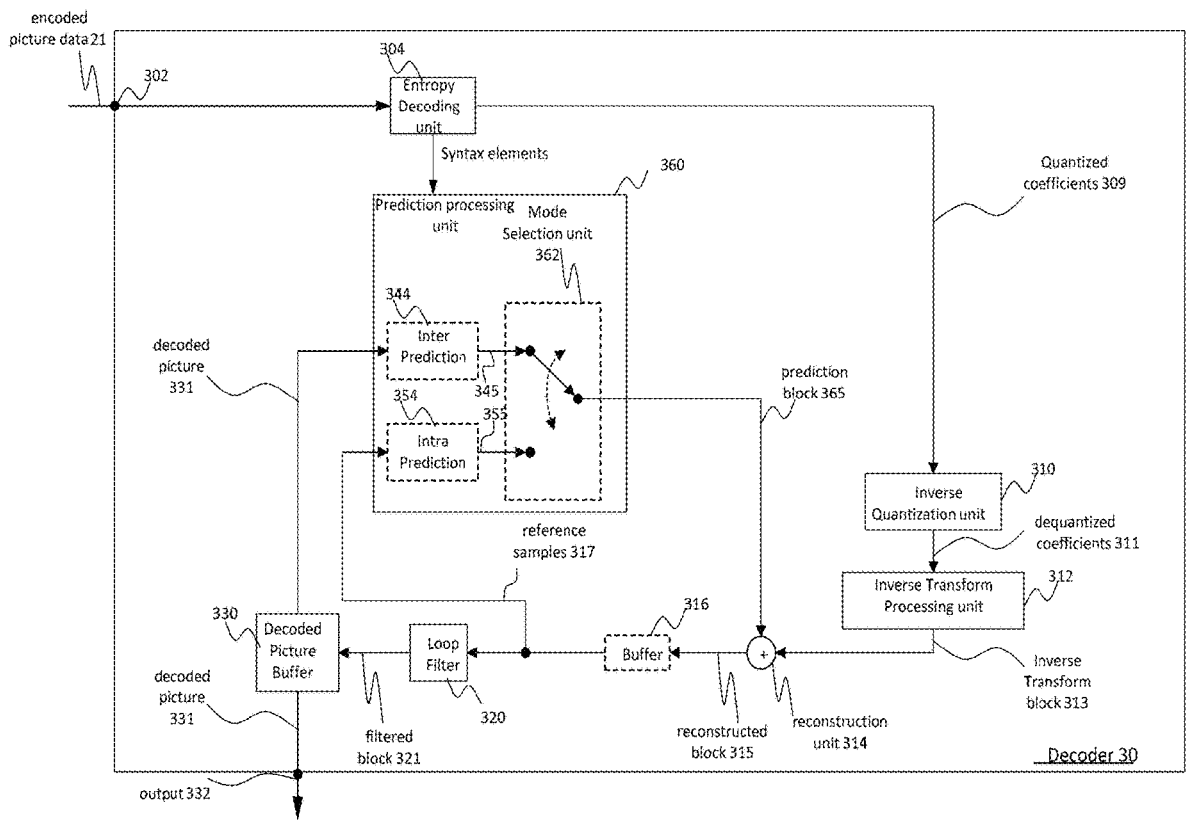
FIG. 3 is a block diagram showing an example structure of a video decoder configured to implement embodiments of the invention.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4A:
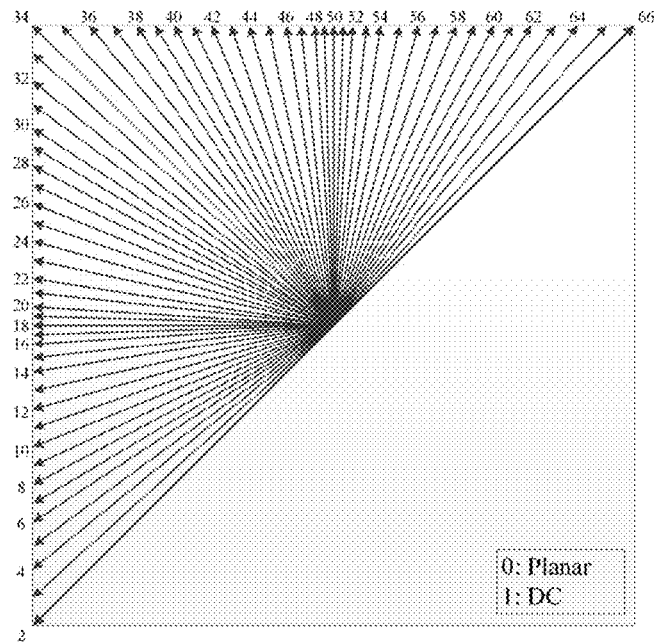
FIG. 4A shows a schematic diagram illustrating proposed 67 intra prediction modes.
Figure 4B:
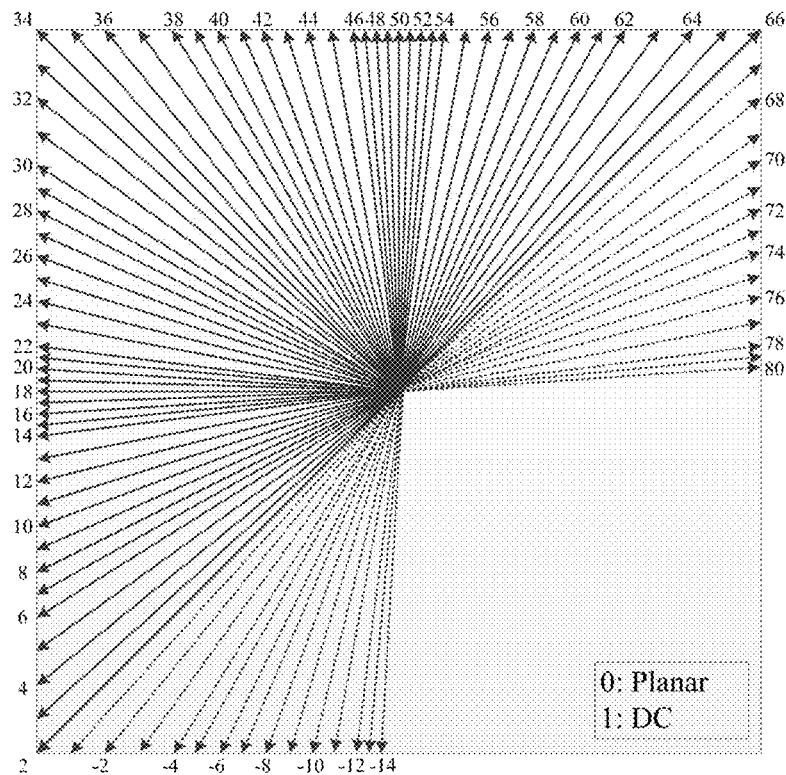
FIG. 4B shows a schematic diagram illustrating proposed 93 intra prediction modes, where the dashed directions are associated with the wide-angle modes that are only applied to non-square blocks.

As shown in FIGS. 4A and 4B, the latest version of JEM has some modes corresponding to skew intra prediction directions. For any of these modes, to predict samples within a block interpolation of a set of neighboring reference samples should be performed, if a corresponding position within a block side is fractional. HEVC and VVC uses linear interpolation between two adjacent reference samples. JEM uses more sophisticated 4-tap interpolation filters. Filter coefficients are selected to be either Gaussian or Cubic ones depending on the width or on the height value. Decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. For example, if selected side length is smaller than or equal to 8 samples, Cubic interpolation 4 tap is applied. Otherwise, interpolation filter is a 4-tap Gaussian one.

FIG. 4A shows an example of 67 intra prediction modes, e.g., as proposed for VVC, the plurality of intra prediction of 67 intra prediction modes comprising: planar mode (index 0), dc mode (index 1), and angular modes with indices 2 to 66, wherein the left bottom angular mode in FIG. 4A refers to index 2 and the numbering of the indices being incremented until index 66 being the top right most angular mode of FIG. 4A. As shown in FIG. 4B, the latest version of VVC has some modes corresponding to skew intra prediction directions, including wide angle ones (shown as dashed lines). For any of these modes, to predict samples within a block interpolation of a set of neighboring reference samples should be performed, if a corresponding position within a block side is fractional.

Specific filter coefficient used in JEM are given in Table 1. Predicted sample is calculated by convoluting with coefficients selected from Table 1 according to subpixel offset and filter type as follows:

$$s(x)=(\Sigma_{i=0}^{i<4}(\text{ref}_{i+x} \cdot c_i)+128)>>8$$

In this equation, ">>" indicates a bitwise shift-right operation.

If Cubic filter is selected, predicted sample is further clipped to the allowed range of values, that is either defined in SPS or derived from the bit depth of the selected component.

TABLE 1

| Subpixel offset | Intra prediction interpolation filters | | | | | | | |
|---|---|---|---|---|---|---|---|---|
| | Cubic filter | | | | Gauss filter | | | |
| | $c_0$ | $c_1$ | $c_2$ | $c_3$ | $c_0$ | $c_1$ | $c_2$ | $c_3$ |
| 0 (integer) | 0 | 256 | 0 | 0 | 47 | 161 | 47 | 1 |
| 1 | −3 | 252 | 8 | −1 | 43 | 161 | 51 | 1 |
| 2 | −5 | 247 | 17 | −3 | 40 | 160 | 54 | 2 |

TABLE 1-continued

Intra prediction interpolation filters

| Subpixel offset | Cubic filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 3 | −7 | 242 | 25 | −4 | 37 | 159 | 58 | 2 |
| 4 | −9 | 236 | 34 | −5 | 34 | 158 | 62 | 2 |
| 5 | −10 | 230 | 43 | −7 | 31 | 156 | 67 | 2 |
| 6 | −12 | 224 | 52 | −8 | 28 | 154 | 71 | 3 |
| 7 | −13 | 217 | 61 | −9 | 26 | 151 | 76 | 3 |
| 8 | −14 | 210 | 70 | −10 | 23 | 149 | 80 | 4 |
| 9 | −15 | 203 | 79 | −11 | 21 | 146 | 85 | 4 |
| 10 | −16 | 195 | 89 | −12 | 19 | 142 | 90 | 5 |
| 11 | −16 | 187 | 98 | −13 | 17 | 139 | 94 | 6 |
| 12 | −16 | 179 | 107 | −14 | 16 | 135 | 99 | 6 |
| 13 | −16 | 170 | 116 | −14 | 14 | 131 | 104 | 7 |
| 14 | −17 | 162 | 126 | −15 | 13 | 127 | 108 | 8 |
| 15 | −16 | 153 | 135 | −16 | 11 | 123 | 113 | 9 |
| 16 (half-pel) | −16 | 144 | 144 | −16 | 10 | 118 | 118 | 10 |
| 17 | −16 | 135 | 153 | −16 | 9 | 113 | 123 | 11 |
| 18 | −15 | 126 | 162 | −17 | 8 | 108 | 127 | 13 |
| 19 | −14 | 116 | 170 | −16 | 7 | 104 | 131 | 14 |
| 20 | −14 | 107 | 179 | −16 | 6 | 99 | 135 | 16 |
| 21 | −13 | 98 | 187 | −16 | 6 | 94 | 139 | 17 |
| 22 | −12 | 89 | 195 | −16 | 5 | 90 | 142 | 19 |
| 23 | −11 | 79 | 203 | −15 | 4 | 85 | 146 | 21 |
| 24 | −10 | 70 | 210 | −14 | 4 | 80 | 149 | 23 |
| 25 | −9 | 61 | 217 | −13 | 3 | 76 | 151 | 26 |
| 26 | −8 | 52 | 224 | −12 | 3 | 71 | 154 | 28 |
| 27 | −7 | 43 | 230 | −10 | 2 | 67 | 156 | 31 |
| 28 | −5 | 34 | 236 | −9 | 2 | 62 | 158 | 34 |
| 29 | −4 | 25 | 242 | −7 | 2 | 58 | 159 | 37 |
| 30 | −3 | 17 | 247 | −5 | 2 | 54 | 160 | 40 |
| 31 | −1 | 8 | 252 | −3 | 1 | 51 | 161 | 43 |

Motion compensation process also utilizes filtering to predict sample values when displacements of the pixels of the reference block are fractional. In JEM, 8-tap filtering is used for luminance component and 4-tap length filtering is used for chrominance component. Motion interpolation filter is firstly applied horizontally, and the output of horizontal filtering is further filtered vertically. Coefficients of 4-tap chrominance filter is given in Table 2.

TABLE 2

Chrominance motion interpolation filter coefficients

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |

TABLE 2-continued

Chrominance motion interpolation filter coefficients

| Subpixel offset | $c_0$ | $c_1$ | $c_2$ | $c_3$ |
|---|---|---|---|---|
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Figure 5:
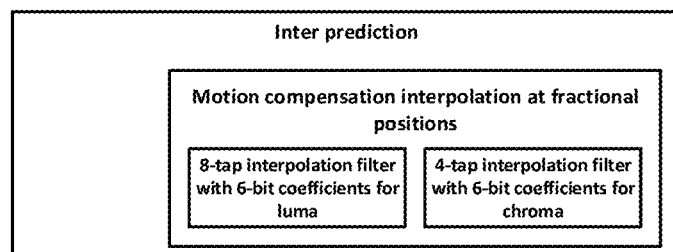
FIG. 5 shows an example of interpolation filters.
Figure 5:
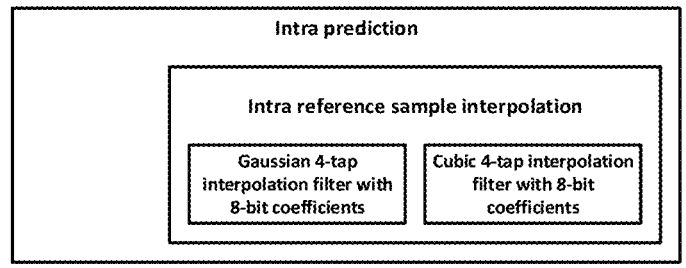
Figure 6:
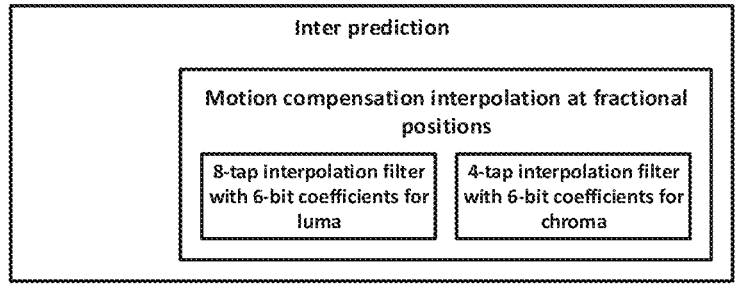
FIG. 6 shows an example of interpolation filters.
Figure 6:
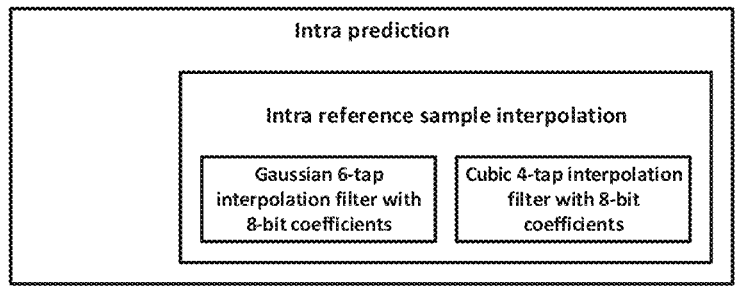
Figure 7:
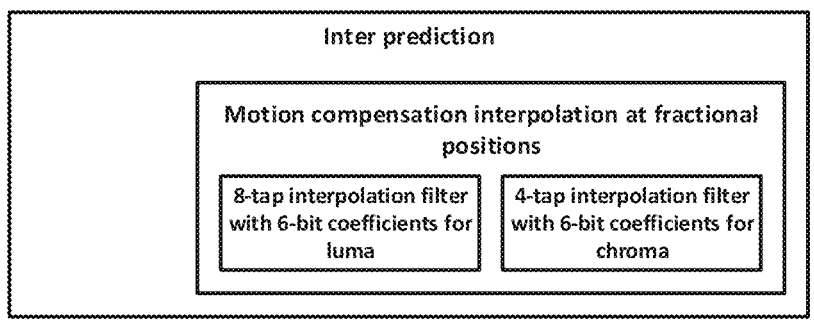
FIG. 7 shows an example of interpolation filters.
Figure 7:
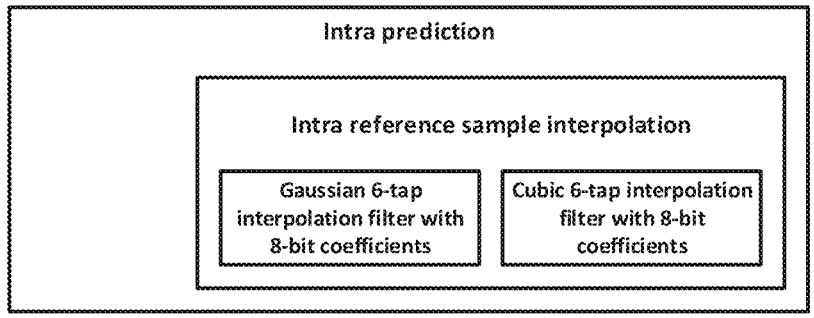
Figure 8:
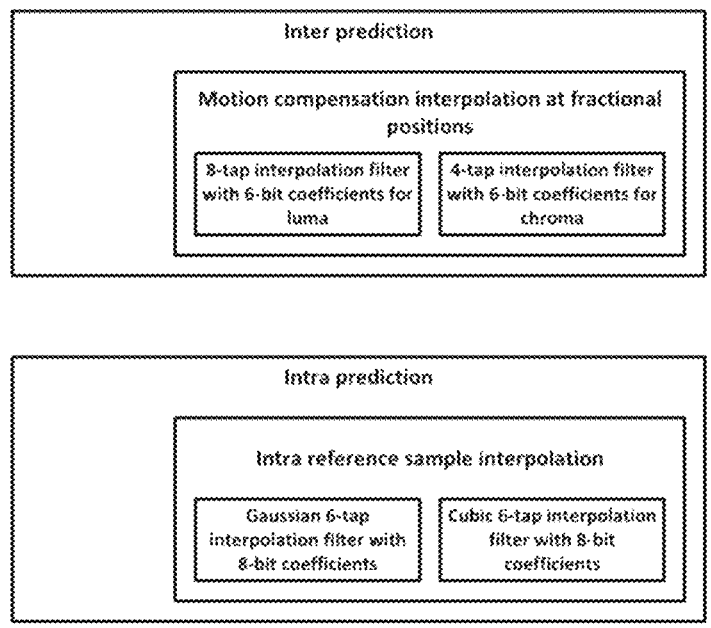
FIG. 8 shows an example of interpolation filters.
Figure 9:
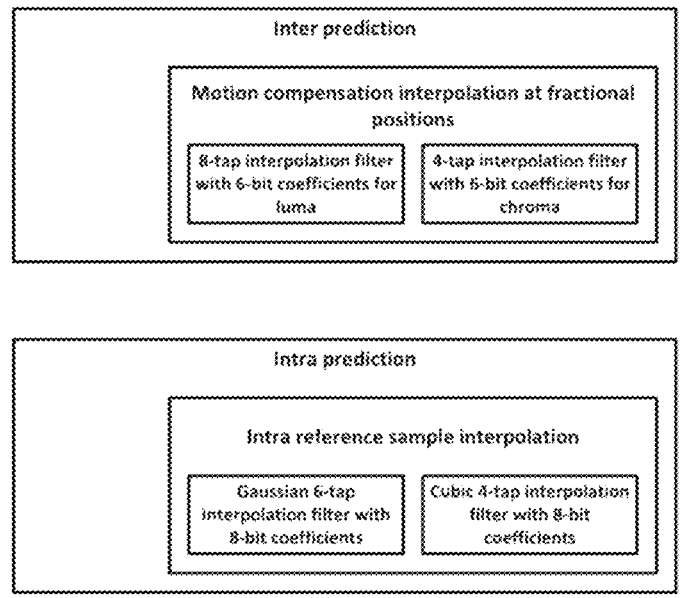
FIG. 9 shows an example of interpolation filters.
Figure 10:
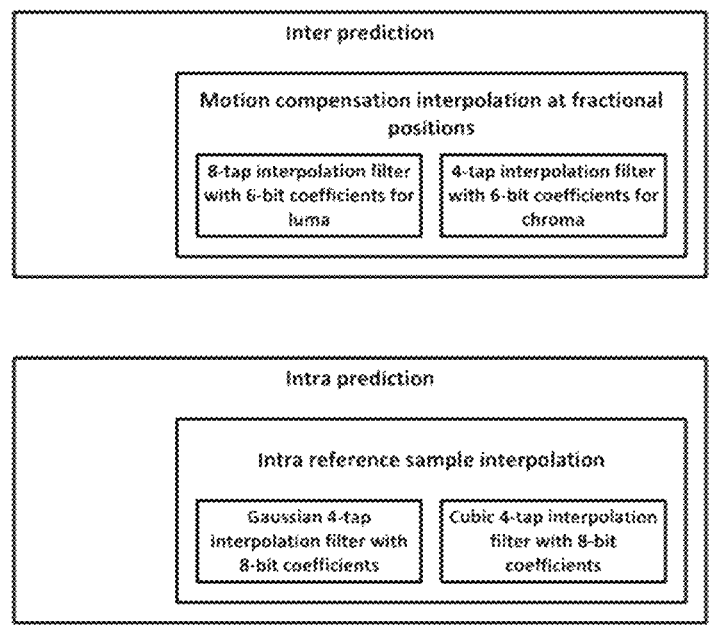
FIG. 10 shows an example of interpolation filters.
Figure 11:
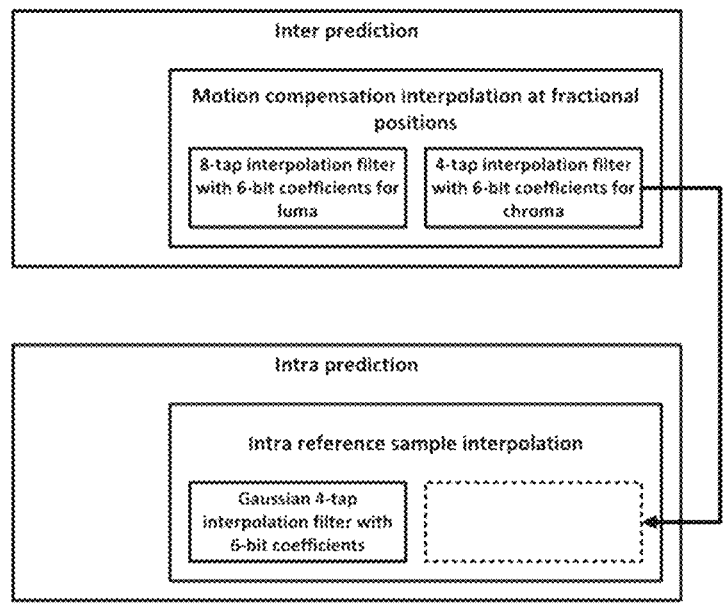
FIG. 11 shows an example of interpolation filters.

The state-of-the-art video coding solutions uses different interpolation filters in intra- and inter-prediction. Particularly, FIGS. 5-11 show different examples of interpolation filters. For example, FIG. 5 shows interpolation filter used in JEM; FIG. 6 shows interpolation filter proposed for Core Experiment CE3-3.1.3 (JVET-K1023).

Look-up tables and hardware modules of chroma motion compensation sub-pel filter for interpolating pixel values may be reused within an intra predictor if they fall into fractional positions between reference samples. Since the same hardware is intended to be in use for both inter- and intra-prediction, the precision of filter coefficients should be consistent, i.e. the number of bits to represent filter coefficients for intra reference sample interpolation should be aligned with the coefficient precision of motion sub-pel motion compensation interpolation filtering.

Figure 12:
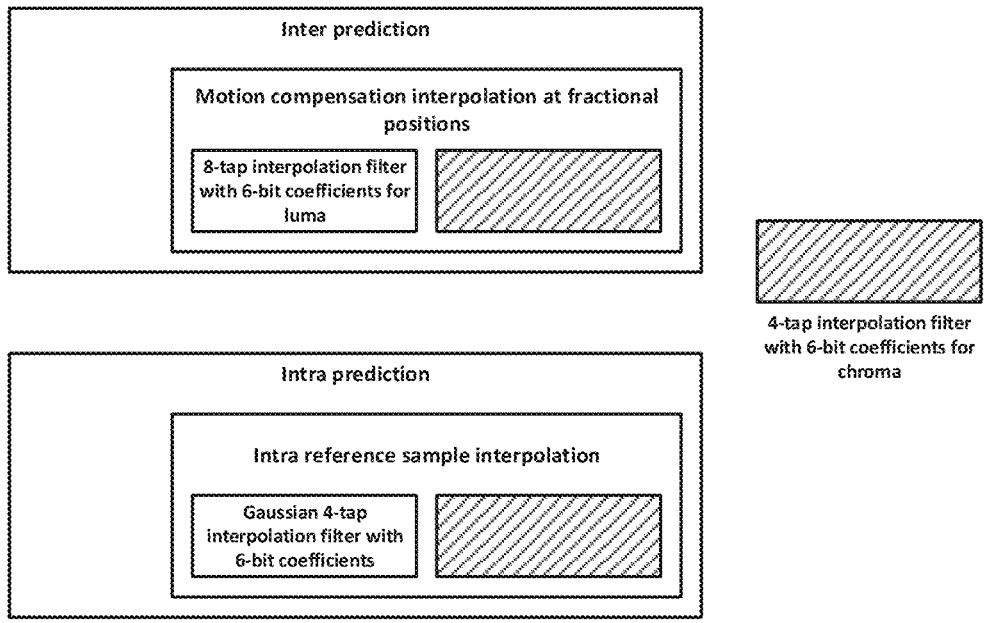
FIG. 12 shows an example of reusing 4-tap interpolation filter in inter- and intra-prediction.

FIG. 12 illustrates an example of reusing 4-tap interpolation filter in inter- and intra-prediction according to certain aspects of the present disclosure. The dashed "4-tap interpolation filter with 6-bit coefficients for chroma" (further referred to as "Unified intra/inter filter") may be used for both processes: interpolation of intra- and inter-predicted samples.

Figure 13:
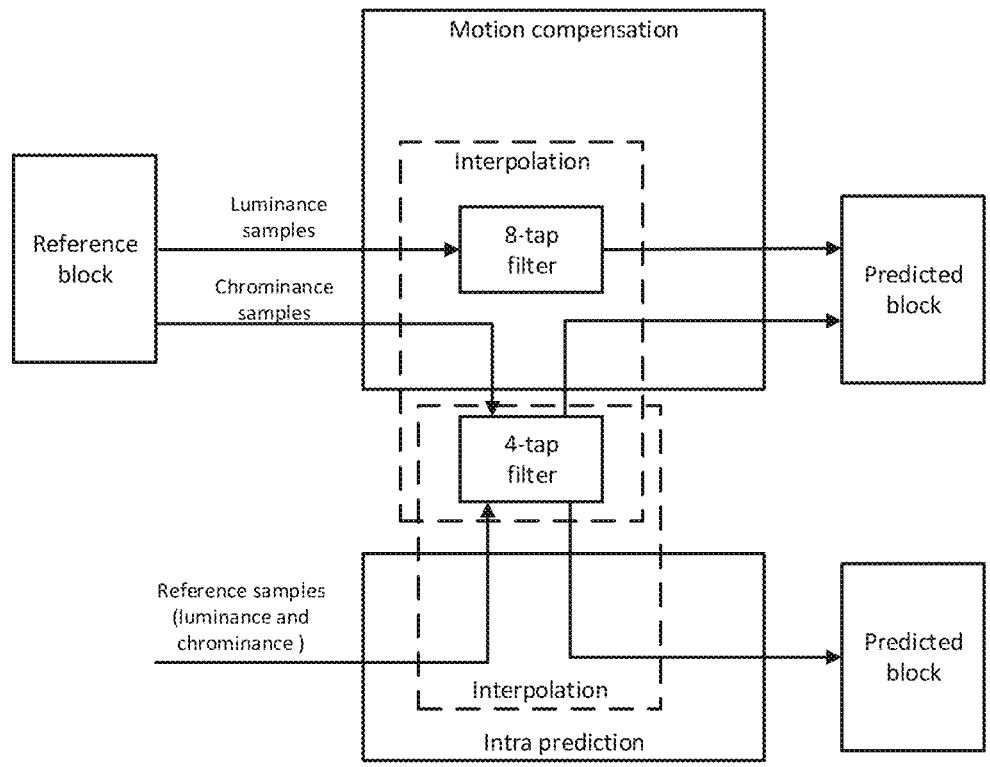
FIG. 13 illustrates an exemplary implementation of the proposed application.

A particular embodiment that utilizes this design is shown in FIG. 13. In this implementation a filtering module is being implemented as a separate unit that is being engaged in both: prediction of chrominance samples in motion compensation and predicting luminance and chrominance samples when performing intra-prediction. In this implementation hardware filtering part is being used in both intra- and inter-prediction processes.

Figure 14:
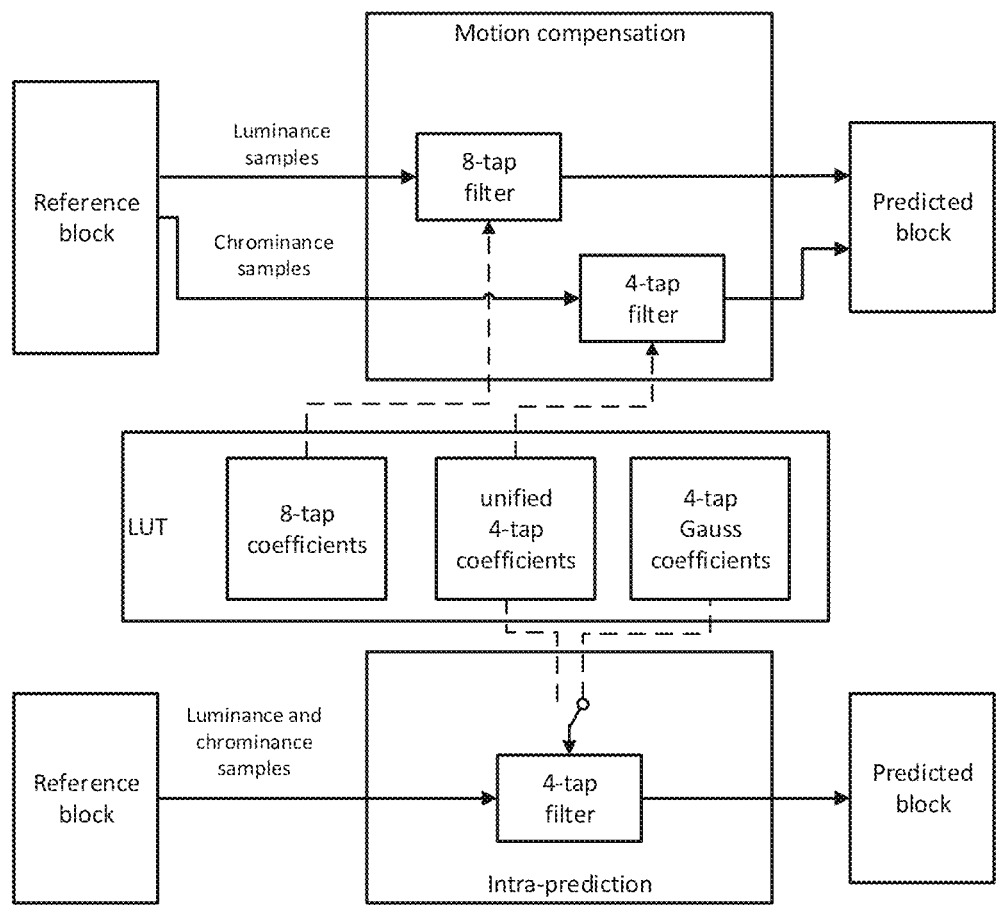
FIG. 14 illustrates an exemplary implementation of the proposed application based on reusing LUT coefficients.

Another embodiment shows implementation when only LUTs of filter coefficients are reused (see FIG. 14). In this implementation hardware filtering modules loads coefficients from LUTs stored in ROM. A switch shown in intra prediction process determines the filter type being used depending on the length of the main side selected for intra prediction process.

A practical embodiment of the proposed application may use the following coefficients (see Table 3a and Table 3b).

TABLE 3a

Intra- and Inter- interpolating filters

| Subpixel offset | Unified intra/inter filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 14 | 29 | 18 | 3 |
| 3 | −2 | 60 | 7 | −1 | 14 | 29 | 18 | 3 |
| 4 | −2 | 58 | 10 | −2 | 14 | 28 | 18 | 4 |
| 5 | −3 | 57 | 12 | −2 | 13 | 28 | 19 | 4 |

TABLE 3a-continued

Intra- and Inter- interpolating filters

| Subpixel offset | Unified intra/inter filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 6 | −4 | 56 | 14 | −2 | 12 | 28 | 20 | 4 |
| 7 | −4 | 55 | 15 | −2 | 12 | 27 | 20 | 5 |
| 8 | −4 | 54 | 16 | −2 | 11 | 27 | 21 | 5 |
| 9 | −5 | 53 | 18 | −2 | 11 | 27 | 21 | 5 |
| 10 | −6 | 52 | 20 | −2 | 10 | 26 | 22 | 6 |
| 11 | −6 | 49 | 24 | −3 | 10 | 26 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 (half-pel) | −4 | 36 | 36 | −4 | 7 | 25 | 25 | 7 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 26 | 10 |
| 22 | −2 | 20 | 52 | −6 | 6 | 22 | 26 | 10 |
| 23 | −2 | 18 | 53 | −5 | 5 | 21 | 27 | 11 |
| 24 | −2 | 16 | 54 | −4 | 5 | 21 | 27 | 11 |
| 25 | −2 | 15 | 55 | −4 | 5 | 20 | 27 | 12 |
| 26 | −2 | 14 | 56 | −4 | 4 | 20 | 28 | 12 |
| 27 | −2 | 12 | 57 | −3 | 4 | 19 | 28 | 13 |
| 28 | −2 | 10 | 58 | −2 | 4 | 18 | 28 | 14 |
| 29 | −1 | 7 | 60 | −2 | 3 | 18 | 29 | 14 |
| 30 | 0 | 4 | 62 | −2 | 3 | 18 | 29 | 14 |
| 31 | 0 | 2 | 63 | −1 | 3 | 17 | 29 | 15 |

TABLE 3b

Intra- and Inter- interpolating filters

| Subpixel offset | DCT-IF | | | | Smoothing filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | −1 | 63 | 2 | 0 | 16 | 32 | 16 | 0 |
| 2 | −2 | 62 | 4 | 0 | 15 | 31 | 17 | 1 |
| 3 | −2 | 60 | 7 | −1 | 15 | 31 | 17 | 1 |
| 4 | −2 | 58 | 10 | −2 | 14 | 30 | 18 | 2 |
| 5 | −3 | 57 | 12 | −2 | 14 | 30 | 18 | 2 |
| 6 | −4 | 56 | 14 | −2 | 13 | 29 | 19 | 3 |
| 7 | −4 | 55 | 15 | −2 | 13 | 29 | 19 | 3 |
| 8 | −4 | 54 | 16 | −2 | 12 | 28 | 20 | 4 |
| 9 | −5 | 53 | 18 | −2 | 12 | 28 | 20 | 4 |
| 10 | −6 | 52 | 20 | −2 | 11 | 27 | 21 | 5 |
| 11 | −6 | 49 | 24 | −3 | 11 | 27 | 21 | 5 |
| 12 | −6 | 46 | 28 | −4 | 10 | 26 | 22 | 6 |
| 13 | −5 | 44 | 29 | −4 | 10 | 26 | 22 | 6 |
| 14 | −4 | 42 | 30 | −4 | 9 | 25 | 23 | 7 |
| 15 | −4 | 39 | 33 | −4 | 9 | 25 | 23 | 7 |
| 16 (half-pel) | −4 | 36 | 36 | −4 | 8 | 24 | 24 | 8 |
| 17 | −4 | 33 | 39 | −4 | 8 | 24 | 24 | 8 |
| 18 | −4 | 30 | 42 | −4 | 7 | 23 | 25 | 9 |
| 19 | −4 | 29 | 44 | −5 | 7 | 23 | 25 | 9 |
| 20 | −4 | 28 | 46 | −6 | 6 | 22 | 26 | 10 |
| 21 | −3 | 24 | 49 | −6 | 6 | 22 | 26 | 10 |
| 22 | −2 | 20 | 52 | −6 | 5 | 21 | 27 | 11 |
| 23 | −2 | 18 | 53 | −5 | 5 | 21 | 27 | 11 |
| 24 | −2 | 16 | 54 | −4 | 4 | 20 | 28 | 12 |
| 25 | −2 | 15 | 55 | −4 | 4 | 20 | 28 | 12 |
| 26 | −2 | 14 | 56 | −4 | 3 | 19 | 29 | 13 |
| 27 | −2 | 12 | 57 | −3 | 3 | 19 | 29 | 13 |
| 28 | −2 | 10 | 58 | −2 | 2 | 18 | 30 | 14 |
| 29 | −1 | 7 | 60 | −2 | 2 | 18 | 30 | 14 |
| 30 | 0 | 4 | 62 | −2 | 1 | 17 | 31 | 15 |
| 31 | 0 | 2 | 63 | −1 | 1 | 17 | 31 | 15 |

Intra predicted sample is calculated by convoluting with coefficients selected from Table 3a or Table 3b according to subpixel offset and filter type as follows:

$$s(x) = \left(\sum_{i=0}^{i<4}(ref_{i+x} \cdot c_i) + 32\right) \gg 6$$

In this equation, ">>" indicates a bitwise shift-right operation.

If "Unified intra/inter filter" filter is selected, predicted sample is further clipped to the allowed range of values, that is either defined in SPS or derived from the bit depth of the selected component.

For intra reference sample interpolation and sub-pel motion compensation interpolation, the same filter can be used to reuse hardware modules and to reduce the total size of required memory.

The precision of filter coefficients used for intra reference sample interpolation in addition to the reused filter should be aligned with the precision of coefficients of the above-mentioned reused filter.

Luma processing in motion compensation does not necessarily use 8-tap filtering but may also operate on 4-tap filtering. In this case the 4-tap filter could be selected to be unified.

The embodiments may be applied in different parts of intra prediction process that may involve interpolation. Particularly, when extending main reference samples, side reference samples may also be filtered using unified interpolation filter (see JVET-K0211 for details).

Intra block copy operations also involve interpolation step that may use the proposed technology (see [Xiaozhong Xu, Shan Liu, Tzu-Der Chuang, Yu-Wen Huang, Shawmin Lei, Krishnakanth Rapaka, Chao Pang, Vadim Seregin, Ye-Kui Wang, Marta Karczewicz: Intra Block Copy in HEVC Screen Content Coding Extensions. IEEE J. Emerg. Sel. Topics Circuits Syst. 6(4): 409-419 (2016)] for Intra block copy description).

A method for aspect-ratio dependent filtering for intra prediction is disclosed, the method comprising: selecting an interpolation filter for a block to be predicted depending on an aspect ratio of the block.

In an example, wherein selecting the interpolation filter depending on a direction for thresholding an intra prediction mode of the block to be predicated.

In an example, wherein the direction corresponds to an angle of main diagonal of the block to be predicted.

In an example, an angle of the direction is calculated as:

$$\alpha_T = \arctan\left(\frac{H}{W}\right),$$

where W,H are width and height of the block to be predicted, respectively.

In an example, wherein Aspect ratio
$R_A = \log_2(W) - \log_2(H)$, where W,H are width and height of the block to be predicted, respectively.

In an example, the angle of main diagonal of the block to be predicted are determined based on the aspect ratio.

In an example, a threshold of an intra prediction mode of the block is determined based on the angle of main diagonal of the block to be predicted.

In an example, wherein selecting the interpolation filter depending on which side reference samples being used belong to.

In an example, wherein a straight line with an angle corresponding to an intra direction divides the block onto two areas.

In an example, wherein the reference samples belonging to different areas are predicted using different interpolation filters.

In an example, wherein the filter includes a cubic interpolation filter or a gauss interpolation filter.

In one implementation form of the present application, a frame is same as a picture.

In one implementation form of the present application, a value corresponding to the VER_IDX is 50; a value corresponding to the HOR_IDX is 18; a value corresponding to the VDIA_IDX is 66, and this value may be the largest value in the values corresponding to the angular modes; the value 2 which corresponding to the intra mode 2 may be the smallest value in the values corresponding to the angular modes; a value corresponding to the DIA_IDX is 34.

The present disclosure targets improvement in the intra mode signaling scheme. In the present disclosure, a video decoding method and a video decoder are proposed.

In another aspect of the present application, a decoder comprising processing circuitry is disclosed configured for carrying out the above decoding methods.

In another aspect of the present application, a computer program product is disclosed which comprising a program code for performing the above decoding methods.

In another aspect of the present application, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above decoding methods.

The processing circuitry can be implemented in hardware, or in a combination of hardware and software, for example by a software programmable processor or the like.

The processing circuitry can be implemented in hardware, or in a combination of hardware and software, for example by a software programmable processor or the like.

H.264/AVC and HEVC specifies that a low-pass filter could be applied to reference samples prior being used in intra prediction process. A decision on whether to use reference sample filter or not is determined by intra prediction mode and block size. This mechanisms may be referred to as Mode Dependent Intra Smoothing (MDIS). There also exists a plurality of methods related to MDIS. For example, the Adaptive Reference Sample Smoothing (ARSS) method may explicitly (i.e. a flag is included into a bitstream) or implicitly (i.e., for example, data hiding is used to avoid putting a flag into a bitstream to reduce signaling overhead) signal whether the prediction samples are filtered. In this case, the encoder may make the decision on smoothing by testing the Rate-Distortion (RD) cost for all potential intra prediction modes.

As shown in FIGS. 4A and 4B, the latest version of JEM (JEM-7.2) has some modes corresponding to skew intra prediction directions. For any of these modes, to predict samples within a block interpolation of a set of neighboring reference samples should be performed, if a corresponding position within a block side is fractional. HEVC and VVC use linear interpolation between two adjacent reference samples. JEM uses more sophisticated 4-tap interpolation filters. Filter coefficients are selected to be either Gaussian or Cubic ones depending on the width or on the height value. A decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. For example, if selected side length is smaller than or equal to 8 samples, Cubic interpolation 4 tap is applied. Otherwise, interpolation filter is a 4-tap Gaussian one.

Figure 15:
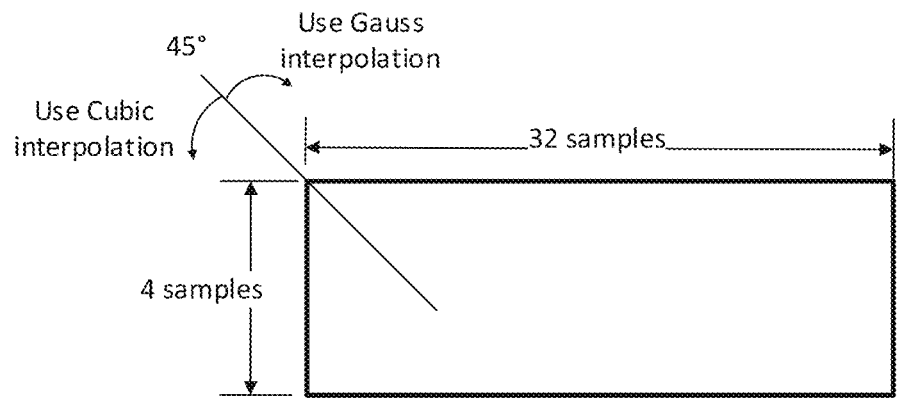
FIG. 15 illustrates an example of interpolation filter selection.

An example of interpolation filter selection for modes smaller and greater than diagonal one (denoted as 45°) in the case of 32×4 block is shown in FIG. 15.

Figure 16:
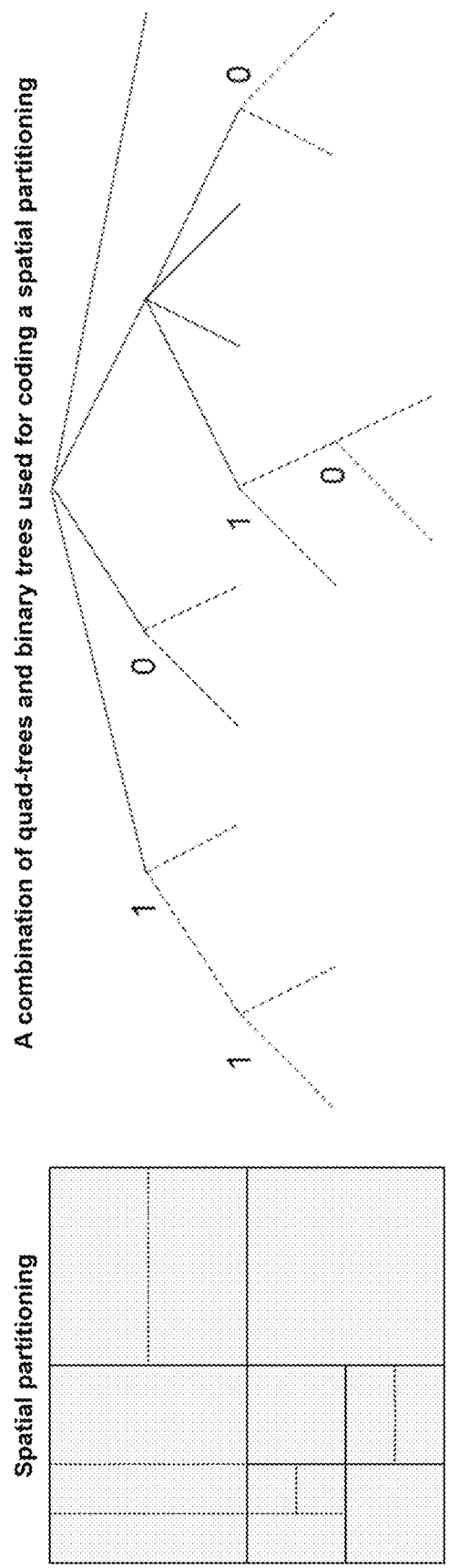
FIG. 16 illustrates an example of QTBT.

In VVC, a partitioning mechanism based on both quad-tree and binary tree and known as QTBT is used. As depicted in FIG. 16, QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree.

However, VVC in its current state applies the same filter to the both sides of reference samples (left and top ones). No matter whether a block is oriented vertically or horizontally, a reference sample filter will be the same for both reference sample sides.

Figure 17:
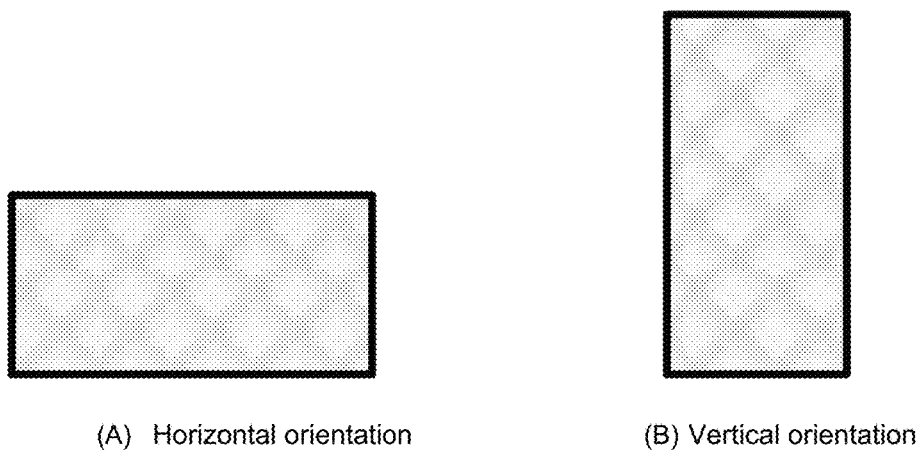
FIG. 17 illustrates an example of orientation of rectangular blocks.

In this document, the terms "vertically oriented block" ("vertical orientation of a block") and "horizontally oriented block" ("horizontal orientation of a block") are applied to rectangular blocks generated by the QTBT framework. These terms have the same meaning as shown in FIG. 17.

The present disclosure proposes a mechanism to select different reference sample filters in order to consider orientation of a block. In examples, width and height of a block are checked independently so that different reference sample filters are applied to reference sample located on different sides of a block to be predicted.

In prior-art review, it was described that interpolation filter selection is harmonized with the decision on main reference side selection. Both of these decisions currently rely on comparison of intra prediction mode with the diagonal (45 degree) direction.

Figure 18:
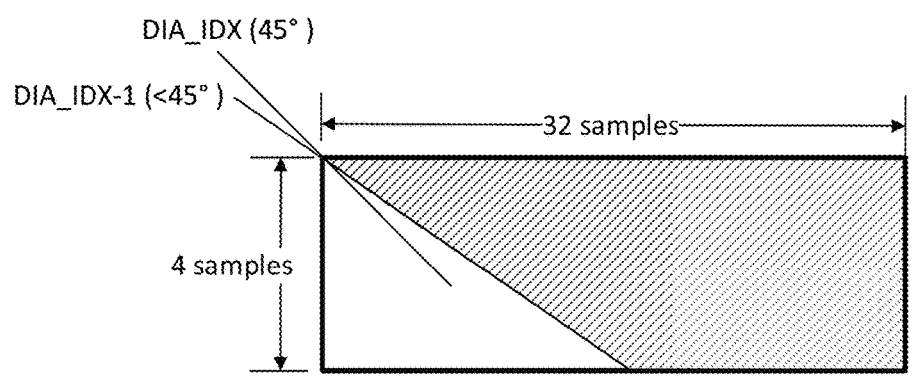
FIG. 18 shows an example of side-length dependent reference filter selection.

However, it could be noticed that this design has a serious flaw for the elongate blocks. From FIG. 18 it could be observed that even if shorter side is selected as the main reference using mode comparison criteria, most of the predicted pixels would still be derived from the reference samples of the longer side (shown as dashed area).

Figure 19:
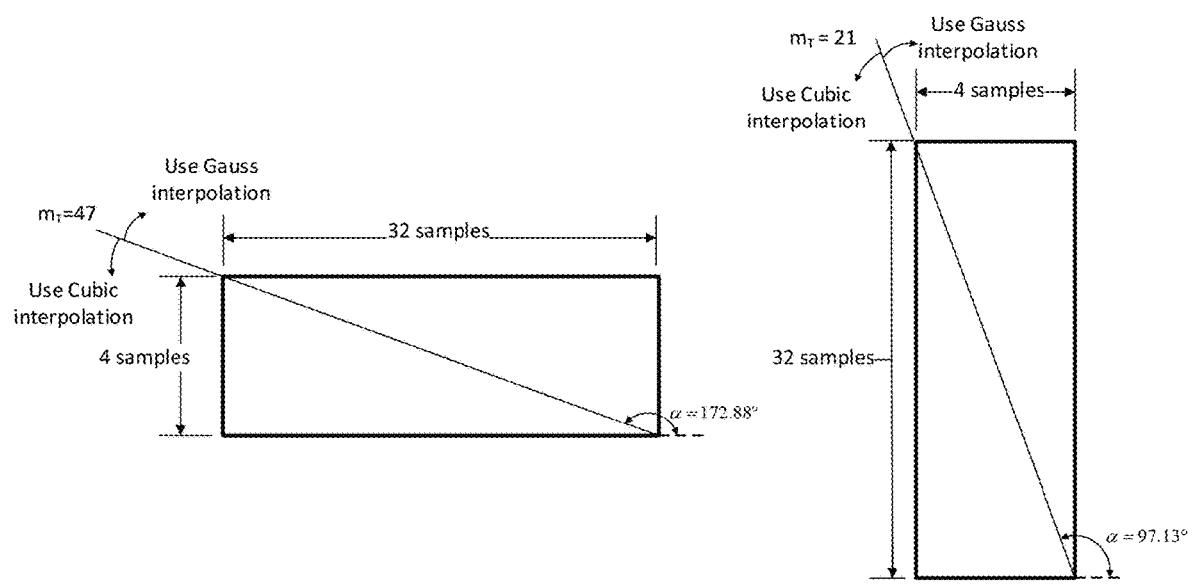
FIG. 19 shows an example of alternative direction for thresholding an intra prediction mode during interpolation filter selection process.

The present disclosure proposes to use an alternative direction for thresholding an intra prediction mode during interpolation filter selection process, such as the directions correspond to the angle of main diagonal of the block to be predicted. For example, for blocks of size 32×4 and 4×32, threshold mode mT used to determine reference sample filter is defined as it is shown in FIG. 19.

The value of the threshold intra prediction angle could be calculated using the following formula:

$$\alpha_T = \arctan\left(\frac{H}{W}\right),$$

Where W and H are the block width and height, respectively.

Figure 20:
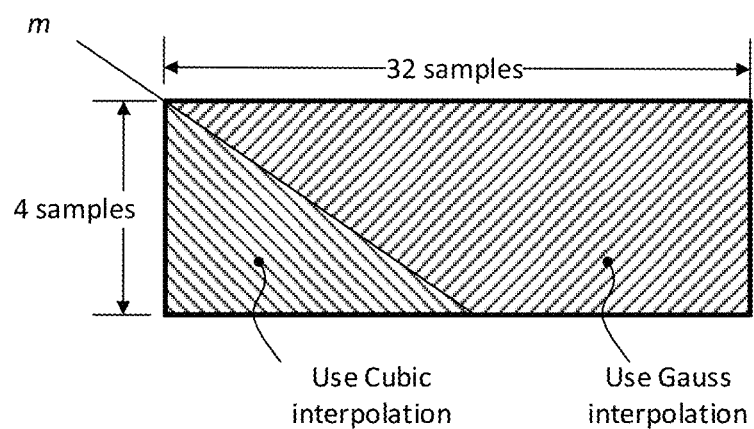
Figure 21:
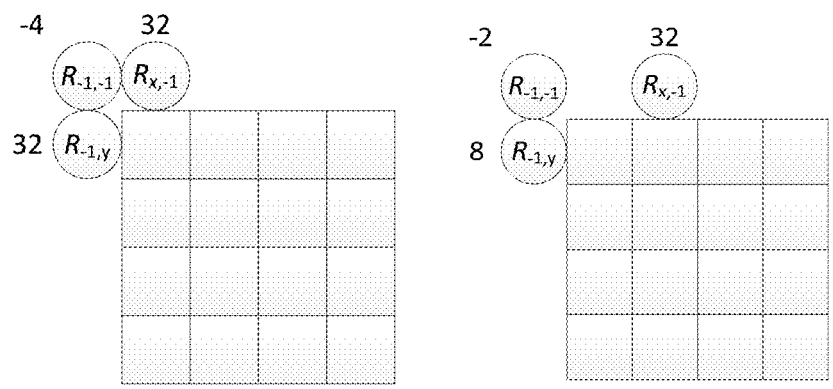
FIG. 21 shows DC mode PDPC weights for (0, 0) and (1, 0) positions inside one 4×4 block.

Another embodiment of the present disclosure is to use different interpolation filters depending on which side the reference samples being used belong to. An example of this determination is shown in FIG. 20.

A straight line with an angle corresponding to intra direction m divides a predicted block onto two areas. Samples belonging to different areas are predicted using different interpolation filters. Exemplary values of $m_T$ (for the set of intra prediction modes defined in BMS1.0) and corresponding angles are given in Table 4. Angles α are given as shown in FIGS. 19-20.

TABLE 4

Exemplary values of $m_T$ (for the set of intra prediction modes defined in BMS1.0)

| Aspect ratio $R_A = \log_2(W) - \log_2(H)$ | Angle of main diagonal α, degrees | Threshold intra prediction mode $m_T$ |
|---|---|---|
| −5 | 81.78 | 19 |
| −4 | 93.57 | 19 |
| −3 | 97.13 | 21 |
| −2 | 104.04 | 23 |
| −1 | 116.57 | 27 |
| 0 | 135.00 | DIA_IDX (34) |
| 1 | 153.44 | 41 |
| 2 | 165.96 | 45 |
| 3 | 172.88 | 47 |
| 4 | 176.42 | 49 |
| 5 | 178.21 | 49 |

Compared to existing technology and solutions, the present disclosure uses samples within a block that are predicted using different interpolation filters, wherein the interpolation filter used to predict a sample is selected according to block shape, orientation being horizontal or vertical, and intra prediction mode angle.

The present disclosure may be applied at the stage of reference sample filtering. In particular, it is possible to determine reference sample smoothing filter using similar rules described above for interpolation filter selection process.

In addition to interpolation filtering, reference sample filtering can be also applied to reference samples immediately before predicting samples within an intra predictor. The filtered reference samples obtained after reference sample filtering can be used either for copying them into corresponding samples within an intra predictor according to a selected direction of the intra prediction mode or for further interpolation filtering. The following filters can be applied to reference samples in this way:

TABLE 5

Exemplary reference sample filters

| Index | Filter length | Filter coefficients |
|---|---|---|
| 0 | 1 | [1], i.e. by-pass mode is applied as no filtering is performed in this case |
| 1 | 3 | [1, 2, 1] |
| 2 | 5 | [2, 3, 6, 3, 2] |
| 3 | 5 | [1, 4, 6, 4, 1] |

Result of the directional prediction could be combined with the result of prediction obtained by different means, including the following:
  Boundary smoothing,
  PDPC and simplified PDPC In case of boundary smoothing and PDPC, several first columns or several first rows of predicted block is combined with the additional prediction signal generated from the neighboring samples.

Particular implementation of simplified PDPC could be performed differently, depending on the intra prediction mode:

For planar, DC, HOR/VER intra prediction modes (denoted as 0, 1, 18, 50 respectively in FIG. 4A and FIG. 4B), the following steps are performed:

The prediction sample P(x,y) located at (x,y) is calculated as follows:

$$P(x,y)=(wL \times R_{-1,y}+wT \times R_{x,-1}+wTL \times R_{-1,-1}+(64-wL-wT-wTL) \times P(x,y)+32)>>6$$

where $R_{x,-1}$, $R_{-1,y}$ represents the reference samples located at top and left of the current sample (x,y), and $R_{-1,-1}$ represents the reference sample located in the top-left corner of the current block. The DC mode weights are calculated as follows:

$$wT = 32 >> ((y << 1) >> \text{shift}),$$

$$wL = 32 >> ((x << 1) >> \text{shift}),$$

$$wTL = -(wL >> 4) - (wT >> 4),$$

where $$\text{shift} = (\log_2(\text{width}) + \log_2(\text{height}) + 2) >> 2.$$

For planar mode, wTL=0, while for the horizontal mode wTL=wT and for vertical mode wTL=wL. DC mode PDPC weights (wL, wT, wTL) for (0, 0) and (1, 0) positions inside one 4×4 block are shown.

Figure 22:
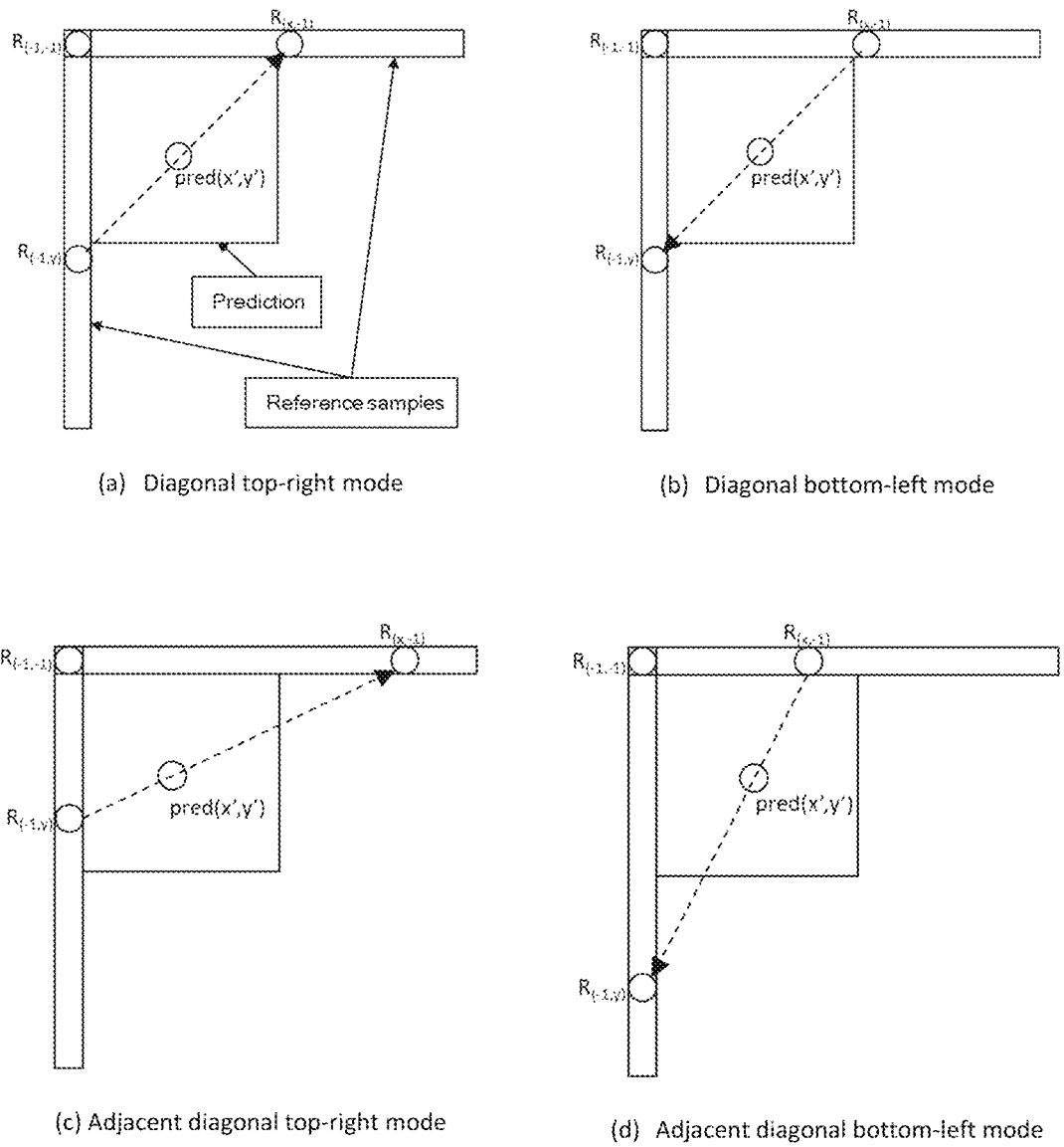
FIG. 22 shows definition of samples used by PDPC extension to diagonal and adjacent angular intra modes.

For diagonal (denoted as 2 and 66 in FIG. 4A and FIG. 4B) and adjacent modes (directional modes not less than 58 and not greater than 10 in FIG. 4A or FIG. 4B) processing is performed as described below:

FIG. 22(a) illustrates the definition of reference samples $R_{x,-1}$, $R_{-1,y}$ and $R_{-1,-1}$ for the extension of PDPC to the top-right diagonal mode. The prediction sample pred(x', y') is located at (x',y') within the prediction block. The coordinate x of the reference sample $R_{x,-1}$ is given by: x=x'+y'+1, and the coordinate y of the reference sample $R_{-1,y}$ is similarly given by: y=x'+y'+1.

The PDPC weights for the top-right diagonal mode are:

$$wT=16>>((y'<<1)>>\text{shift}), wL=16>>((x'<<1)>>\text{shift}), wTL=0.$$

Similarly, FIG. 22(b) illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by: x=x'+y'+1, and the coordinate y of the reference sample $R_{-1,y}$ is: y=x'+y'+1. The PDPC weights for the top-right diagonal mode are: wT=16>>((y'<<1)>>shift), wL=16>>((x'<<1)>>shift), wTL=0. The case of an adjacent top-right diagonal mode is illustrated in FIG. 22(c). The PDPC weights for an adjacent top-right diagonal mode are: wT=32>>((y'<<1)>>shift), wL=0, wTL=0. Similarly, the case of an adjacent bottom-left diagonal mode is illustrated in FIG. 22d). The PDPC weights for an adjacent bottom-left diagonal mode are: wL=32>>

((x'<<1)>>shift), wT=0, wTL=0. The reference sample coordinates for the last two cases are computed using the tables that are already used for angular mode intra prediction. Linear interpolation of the reference samples is used if fractional reference sample coordinates are calculated.

However, processing (e.g. filtering) of the neighboring samples used as an input process for directional intra prediction may be different from those that are passed to the input of PDPC or simplified PDPC. For example, directional intra prediction could use filtered reference samples while PDPC or simplified PDPC use unfiltered ones. Particularly, when directional intra prediction mode is a wide-angle one that has an integer-sample subpixel offset (intraPredAngle, given in Table X and described further), reference samples could be filtered, while PDPC uses unfiltered reference samples.

Figure 23:
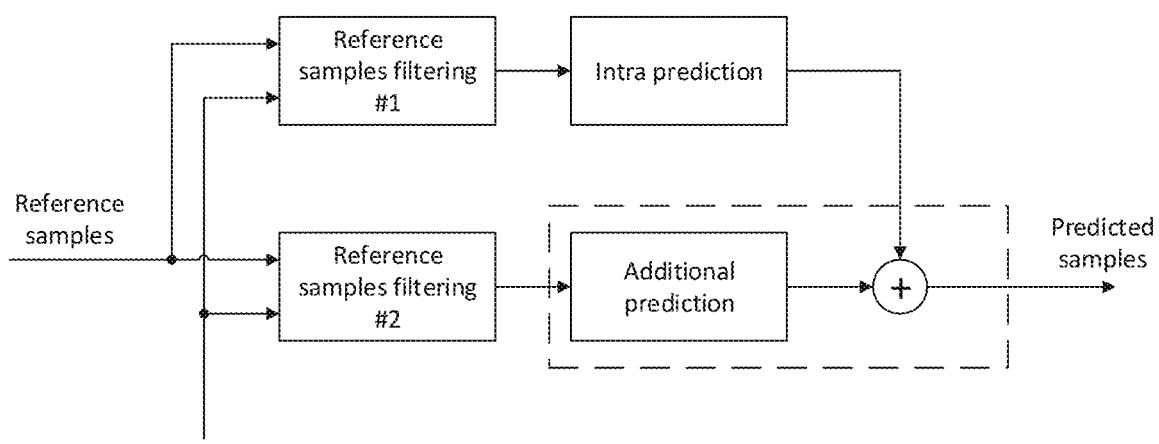
FIG. 23 shown an exemplary implementation of simplified PDPC.

In case of simplified PDPC, the current implementation is shown in FIG. 23.

In FIG. 23, dashed box could specify one of the following:
a simplified PDPC process;
PDPC process (e.g., as specified in JEM);
Boundary smoothing (e.g., specified in HEVC). other methods that use linear combination to update the results of intra prediction specified. For example, decision on the filter applied to reference samples could be taken according to table X. Table X uses the following denotations:

"S" means that decision depends on the block size. This size dependency is performed as follows: block size parameter nTbS set equal to (log 2(nTbW)+Log 2(nTbH))>>1 is compared to a predetermined threshold $T_S$. In case nTbS>$T_S$, the same processing is applied as described further for the value of "1". Otherwise, if nTbS≤$T_S$, the same processing is applied as described further for the value of "0". Here nTbW and nTbH denote width and height of the predicted block, respectively, and ">>" denotes a right-shift operation. The value of $T_S$ could be set, e.g. to 2, or to be defined depending on intra prediction mode (e.g., as it is done in the case of MDIS for HEVC);

"1" means that processing is enabled. In case of reference sample filtering, the value of "1" means that reference samples are processed by [1 2 1] filter;

"0" means that processing is disabled. In case of reference sample filtering, the value of "1" means that reference samples are processed by a [1] filter, i.e. that no filtering is applied to the reference samples.

TABLE X

Decisions on reference sample filtering depending on directional intraPredMode (as shown in FIG. 4B)

| intraPredMode | Positive diagonal modes: 2 and VDIA_IDX (66) | Negative diagonal mode: DIA_IDX (34) | Integer slope wide-angle modes: −14, −12, −10, −6, 72, 76, 78, 80 | HOR_IDX (18) and VER_IDX (50) | Fractional slope modes: other directional modes |
|---|---|---|---|---|---|
| Reference sample filtering #1 | S | S | 0 | 0 | 0 |
| Directional interpolation filtering | 0 | 0 | 1 | 0 | 1 |
| Reference sample filtering #2 | S (coupled with reference sample filtering #1) | 0 | 0 | 0 | 0 |
| Simplified PDPC | 1 | 0 | 1 | 1 | 0 or 1 (different for different embodiments) |

In all of these cases this process includes the update step, i.e. a linear combination of the outputs of intra prediction and additional part generation steps.

In particular implementation, step of "reference samples filtering #1" and intra prediction could be merged by convolving subpixel interpolation filter coefficients with the coefficients of the reference samples filter. However, for intra prediction modes with non-fractional displacements (cases when intraPredAngle is a multiple of 32) this merge is redundant, because filtering operation in this case will be performed per each predicted sample but not per each reference sample as it is shown in FIG. 23.

From FIG. 23, it could be noticed that reference samples could be filtered differently depending on intraPredMode Certain aspects of the disclosure aim at unification of reference sample processing for with the combination of an output of directional prediction and additional prediction signal used to improve visual quality of predicted block. The result of this unification is that reference samples are processed only once, and the result of this processing is reused by both directional intra prediction process and generating additional prediction (see FIG. 24).

Figure 24:
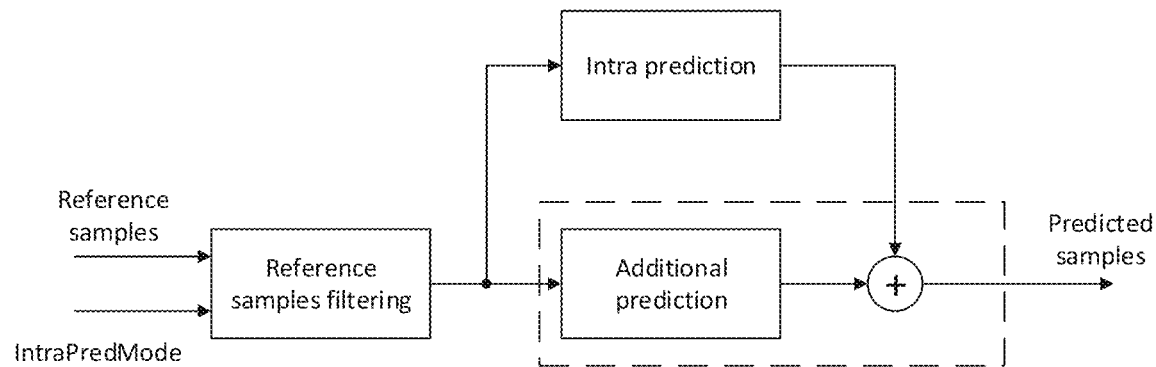
FIG. 24 shown an exemplary unification implementation.

It could be noticed, that in case shown in FIG. 24, only one step of reference sample filtering is required. Therefore, filtering decision making is done in accordance with Table Y.

TABLE Y

Decisions on reference sample filtering depending on directional intraPredMode (as shown in FIG. 4B)

| intraPredMode | Positive diagonal modes: 2 and VDIA_IDX (66) | Negative diagonal mode: DIA_IDX (34) | Integer slope wide-angle modes: −14, −12, −10, −6, 72, 76, 78, 80 | HOR_ID X (18) and VER_IDX (50) | Fractional slope modes: other directional modes |
|---|---|---|---|---|---|
| Reference sample filtering | S | S | 1 | 0 | 0 |
| Directional interpolation filtering | 0 | 0 | 0 | 0 | 1 |
| Simplified PDPC | 1 | 0 | 1 | 1 | 0 or 1 (different for different embodiments) |

Additional part in case of simplified PDPC could be performed as specified in the VVC specification. Further the following denotation are used:

$$invAngle = \text{Round}\left(\frac{256*32}{intraPredAngle}\right),$$

is the value of inverse angle $$\text{Round}(x) = \text{Sign}(x) * \text{Floor}(\text{Abs}(x) + 0.5),$$

$$\text{Sign}(x) = \begin{cases} 1; & x > 0 \\ 0; & x = = 0 \\ -1; & x < 0 \end{cases}$$

Floor(x) is the largest integer less than or equal to x,
Log 2(x) is the base-2 logarithm of x.
intraPredAngle is the angle parameter specified in Table X or Table Y,
A=C ? B:D is a ternary assignment operation, where A is set equal to B if condition C is true.
Otherwise, if condition C is false, A is set equal to D.
INTRA_PLANAR is a planar intra prediction mode ( ),
INTRA_DC is a DC intra prediction mode,
INTRA_ANGULARXX is a one of directional intra prediction modes, where XX denotes its number and corresponding direction shown in FIG. 4B.
Given the denotations above, the steps of simplified PDPC could be defined as follows:
Inputs to this process are:
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 . . . nTbW−1, y=0 . . . nTbH−1,
  the neighbouring samples p[x][y], with x=−1, y=−1 . . . refH−1 and x=0 . . . refW−1, y=−1,
  a variable cIdx specifying the colour component of the current block.
Outputs of this process are the modified predicted samples predSamples[x][y] with x=0 . . . nTbW−1, y=0 . . . nTbH−1.
Depending on the value of cIdx, the function clip1Cmp is set as follows:
  If cIdx is equal to 0, clip1Cmp is set equal to $\text{Clip1}_Y$.
  Otherwise, clip1Cmp is set equal to $\text{Clip1}_C$.
The variable nScale is set to ((Log 2(nTbW)+Log 2(nTbH)−2)>>2).
The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], wL[x] and wTL[x][y] with x=0 . . . nTbW−1, y=0 . . . nTbH−1 are derived as follows:
  If predModeIntra is equal to INTRA_PLANAR, INTRA_DC, INTRA_ANGULAR18, or INTRA_ANGULAR50, the following applies:

refL[x][y]=p[−1][y]

refT[x][y]=p[x][−1]

wT[y]=32>>((y <<1)>>nScale)

wL[x]=32>>((x <<1)>>nScale)

wTL[x][y]=(predModeIntra==INTRA_DC) ? ((wL[x]>>4)+(wT[y]>>4)):0

Otherwise, if predModeIntra is equal to INTRA_ANGULAR2 or INTRA_ANGULAR66, the following applies:

refL[x][y]=p[−1][x+y+1]

refT[x][y]=p[x+y+1][−1]

wT[y]=(32>>1)>>((y<<1)>>nScale)

wL[x]=(32>>1)>>((x<<1)>>nScale)

wTL[x][y]=0

Otherwise, if predModeIntra is less than or equal to INTRA_ANGULAR10, the following ordered steps apply:

1. The variables dXPos[y], dXFrac[y], dXInt[y] and dX[x][y] are derived as follows using invAngle:

$$dXPos[y]=((y+1)*invAngle+2)>>2$$

$$dXFrac[y]=dXPos[y] \& 63$$

$$dXInt[y]=dXPos[y]>>6$$

$$dX[x][y]=x+dXInt[y]$$

2. The variables refL[x][y], refT[x][y], wT[y], wL[x] and wTL[x][y] are derived as follows:

$$refL[x][y] = 0 \quad \text{(Eq. 1)}$$
$$refT[x][y] = (dX[x][y] < refW - 1)?$$
$$((64 - dXFrac[y])*mainRef[dX[x][y]] +$$
$$dXFrac[y] * mainRef[dX[x][y] + 1] +$$
$$32) >> 6 : 0$$
$$wT[y] = (dX[x][y] < refW - 1)?32 >> ((y << 1) >> nScale): 0$$
$$wL[x] = 0$$
$$wTL[x][y] = 0$$

Otherwise, if predModeIntra is greater than or equal to INTRA_ANGULAR58 (see FIG. 4B), the following ordered steps apply:

1. The variables dYPos[x], dYFrac[x], dYInt[x] and dY[x][y] are derived as follows using invAngle as specified in below depending on intraPredMode:

$$dYPos[x]=((x+1)*invAngle+2)>>2$$

$$dYFrac[x]=dYPos[x] \& 63$$

$$dYInt[x]=dYPos[x]>>6$$

$$dY[x][y]=y+dYInt[x]$$

2. The variables refL[x][y], refT[x][y], wT[y], wL[x] and wTL[x][y] are derived as follows:

$$refL[x][y] = (dY[x][y] < refH - 1)? \quad \text{(Eq. 2)}$$
$$((64 - dYFrac[x])*sideRef[dY[x][y]] +$$
$$dYFrac[x] * sideRef[dY[x][y] + 1] +$$
$$32) >> 6 : 0$$
$$refT[x][y] = 0$$
$$wT[x] = 0$$
$$wL[y] = (dY[x][y] < refH - 1)?32 >> ((x << 1) >>$$
$$nScale): 0$$
$$wTL[x][y] = 0$$

Otherwise, refL[x][y], refT[x][y], wT[y], wL[x] and wTL [x][y] are all set equal to 0.
The values of the modified predicted samples predSamples [x][y], with x=0 . . . nTbW−1, y=0 . . . nTbH−1 are derived as follows.

predSamples[x][y]=clip1Cmp((refL[x][y]*wL[x]+refT[x][y]*wT[y]−p[−1][−1]*wTL[x][y]+(64−wL[x]−wT[y]+wTL[x][y])*predSamples[x][y]+32)>>6)

In assignment Eq. 1 above simplified PDPC may use nearest-neighbor interpolation instead of linear one:

refT[x][y]=(dX[x][y]<refW−1) ? mainRef[dX[x][y]]:0

Similarly, assignment Eq. 2 could also use nearest-neighbor interpolation:

refL[x][y]=(dY[x][y]<refH−1) ? sideRef[dY[x][y]]:0

Thus, at both encoder and decoder sides, proposed method uses the following as the input data:
directional intra prediction mode (denoted further as predModeIntra, which is shown in FIG. 4A and FIG. 4B)
block size parameter nTbS, which is set equal to (log 2(nTbW)+Log 2(nTbH))>>1, where nTbW and nTbH denote width and height of the predicted block, respectively, and ">>" denotes a right-shift operation.

The following steps may be performed to implement the intra prediction method:

Step 1: Perform reference sample filtering based on reference samples, intra prediction mode intraPredMode and/or block dimensions (width and height).

Step 2: Perform directional intra prediction based on the processed (filtered or unfiltered reference samples) reference samples (results of step 1) in accordance with intraPredAngle.

Step 3: Update the result obtained at step 2 with prediction combination, which could be
PDPC;
Simplified PDPC
wherein input reference samples used in step 3 are the same reference samples obtained at step 1 and used in step 2 for integer slope wide-angle modes (e.g. −14, −12, −10, −6, 72, 76, 78, 80 as specified in Tables 6 and 7)

Reference sample filtering may include: based on predModeIntra, determine whether filtered or unfiltered reference sample buffer should be used. This could be performed by applying one of the filters listed in Table 5. In VVC, filters with indices 0 and 1 are used. For example, reference samples are filtered (filter index "1" in Table 5 is used) in case when predMode is equal to 2, 34 or 66 and when nTbS>2.

Alternative embodiment of the above described method is to use the angle parameter (denoted further as intraPredAngle) at this step instead of intra prediction mode predModeIntra (also spelled as IntraPredMode). In this case, reference samples are filtered (filter index "1" of Table 5 is used) if the value of intraPredAngle is a multiple of 32 and when nTbS>2.

The modification of the VVC specification that enables usage of the proposed method may comprise substituting "the neighbouring samples p[x][y]" by "the reference samples p[x][y]" in the section describing simplified PDPC.

The angle parameter intraPredAngle denotes the subpixel offset between two adjacent rows of predicted samples in fixed point representation having length of fractional part equal to 5-bits. This parameter could be derived from the intra prediction mode is derived from predModeIntra and an exemplary derivation of intraPredAngle from predModeIntra could be defined with a LUT, e.g., as it is shown in Table 8.

TABLE 8

An exemplary LUT to derive intraPredAngle from predModeIntra.

| predModeIntra | | | | | | | | | | | | | | −14 | −13 | −12 | −11 |
|---|---|---|---|---|---|---|---|---|---|---|---|---|---|---|---|---|---|
| intraPredAngle | | | | | | | | | | | | | | 512 | 341 | 256 | 171 |
| predModeIntra | −10 | −9 | −8 | −7 | −6 | −5 | −4 | −3 | −2 | −1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | −1 | −2 | −3 | −4 | −6 | −8 | −10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | −12 | −14 | −16 | −18 | −20 | −23 | −26 | −29 | −32 | −29 | −26 | −23 | −20 | −18 | −16 | −14 | −12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | −10 | −8 | −6 | −4 | −3 | −2 | −1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

The present application further provides the following embodiments:

Embodiment 1. A method of an intra prediction, the method comprises:
processing reference samples;
performing directional intra prediction based on the processed reference samples in accordance with an intra prediction; and
performing an additional prediction based on the processed reference samples.

Embodiment 2. The method of embodiment 1, wherein the processing reference samples comprises reference sample filtering or subpixel interpolation filtering.

Embodiment 3. The method of embodiment 1, wherein the directional intra prediction mode falls into at least one group of:
A. vertical or horizontal modes,
B. diagonal modes that represent angles which are multiple of 45 degree,
C. remaining directional modes.

Embodiment 4. The method of embodiment 3, when the directional intra prediction mode is classified as belonging to group A, no filters are applied to reference samples to generate an intra predictor.

Embodiment 5. The method of embodiment 3, when the directional mode falls into group B, t a reference sample filter is applied to reference samples to copy filtered values into an intra predictor according to the selected direction (no interpolation filters are applied).

Embodiment 6. The method of embodiment 3, when the directional mode is classified as belonging to group C, only an intra reference sample interpolation filter is applied to reference samples to generate a predicted sample that falls into a fractional or integer position between reference samples according to a selected direction (no reference sample filtering is performed).

Embodiment 7. The method of any one of embodiments 1-6, wherein performing reference sample filtering based on at least one of: reference samples, intra prediction mode (IntraPredMode), or a block size parameter.

Embodiment 8. The method of embodiment 7, wherein the processed reference samples include filtered reference samples or unfiltered reference samples.

Embodiment 9. The method of embodiment 7, wherein the method further comprises:
determine whether filtered or unfiltered reference sample buffer is used based on the predModeIntra.

Embodiment 10. The method of embodiment 9, a filter with indices 0 or 1 is used.

Embodiment 11. The method of embodiment 9, Reference samples are filtered (filter index "1" in Table 5 is used) in case when predMode is equal to 2, 34 or 66 and when nTbS>2.

Embodiment 12. The method of embodiment 7, wherein the method further comprises:
determining whether filtered or unfiltered reference sample buffer is used based on the block size parameter, wherein the block size parameter is an angle parameter (intraPredAngle).

Embodiment 13. The method of embodiment 12, reference samples are filtered (filter index "1" of Table 5 is used) if the value of intraPredAngle is a multiple of 32 and when nTbS>2.

Embodiment 14. The method of any one of embodiments 1-13, wherein the additional prediction is Position-Dependent Prediction Combination (PDPC) or simplified PDPC.

Embodiment 15. The method of any one of embodiments 1-14, wherein the intra prediction and the additional prediction are performed in parallel.

Embodiment 16. The method of any one of embodiments 1-15, wherein the directional intra prediction includes integer slope wide-angle modes (e.g. −14, −12, −10, −6, 72, 76, 78, 80 as specified in Tables X and Y).

A decoder or encoder comprising processing circuitry configured for carrying out the above methods.

In the present disclosure, a computer program product comprising a program code is disclosed for performing the above methods.

In the present disclosure, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above methods.

Figure 25:
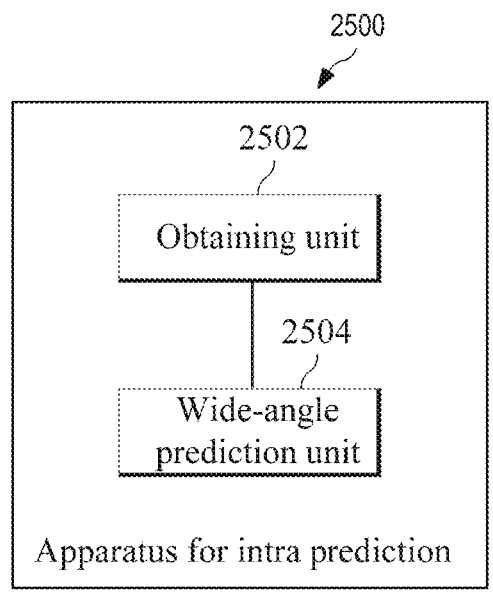
FIG. 25 is a block diagram showing an example structure of an apparatus for intra prediction of a current image block in a current picture of a video.

FIG. 25 is a block diagram showing an example structure of an apparatus 2500 for intra prediction of a current image block in a current picture of a video. In an example, the apparatus 2500 may be corresponding to the intra prediction unit 254 in FIG. 2. In another example, the apparatus 2500 may be corresponding to the intra prediction unit 354 in FIG. 3. The apparatus 2500 is configured to carry out the above methods, and may include:

an obtaining unit 2502, configured to obtain an intra prediction mode of the block; and a wide-angle prediction unit 2504, configured to obtain predicted samples of the block based on filtered reference samples when the intra prediction mode of the block is a wide-angle mode.

The apparatus 2500 may further include a determining unit (not shown in FIG. 25), configured to determine whether the intra prediction mode of the block is a wide-angle mode.

Figure 26:
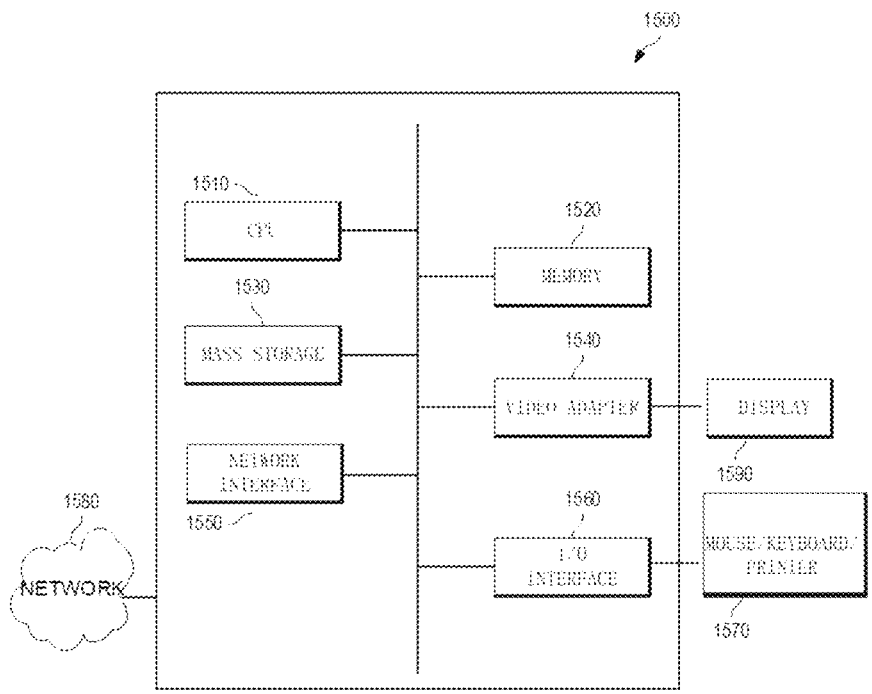
FIG. 26 is a block diagram of an apparatus 1500 that can be used to implement various embodiments.

FIG. 26 is a block diagram of an apparatus 1500 that can be used to implement various embodiments. The apparatus 1500 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1500 can host one or more of the described elements. In some embodiments, the apparatus 1500 is equipped with one or more input/output devices, such as a speaker, microphone, mouse, touchscreen, keypad, keyboard, printer, display, and the like. The apparatus 1500 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1500. For example, the apparatus 1500 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1500, and additional or fewer interface cards may be utilized. For example, a serial interface card (not shown) may be used to provide a serial interface for a printer.

The apparatus 1500 also includes one or more network interfaces 1550, which includes wired links, such as an Ethernet cable or the like, and/or wireless links to access nodes or one or more networks 1580. The network interface 1550 allows the apparatus 1500 to communicate with remote units via the networks 1580. For example, the network interface 1550 may provide communication to database. In an embodiment, the apparatus 1500 is coupled to a local-area network or a wide-area network for data processing and communications with remote devices, such as other processing units, the Internet, remote storage facilities, or the like.

Following is an explanation of the applications of the encoding method as well as the decoding method as shown in the above-mentioned embodiments, and a system using them.

Figure 27:
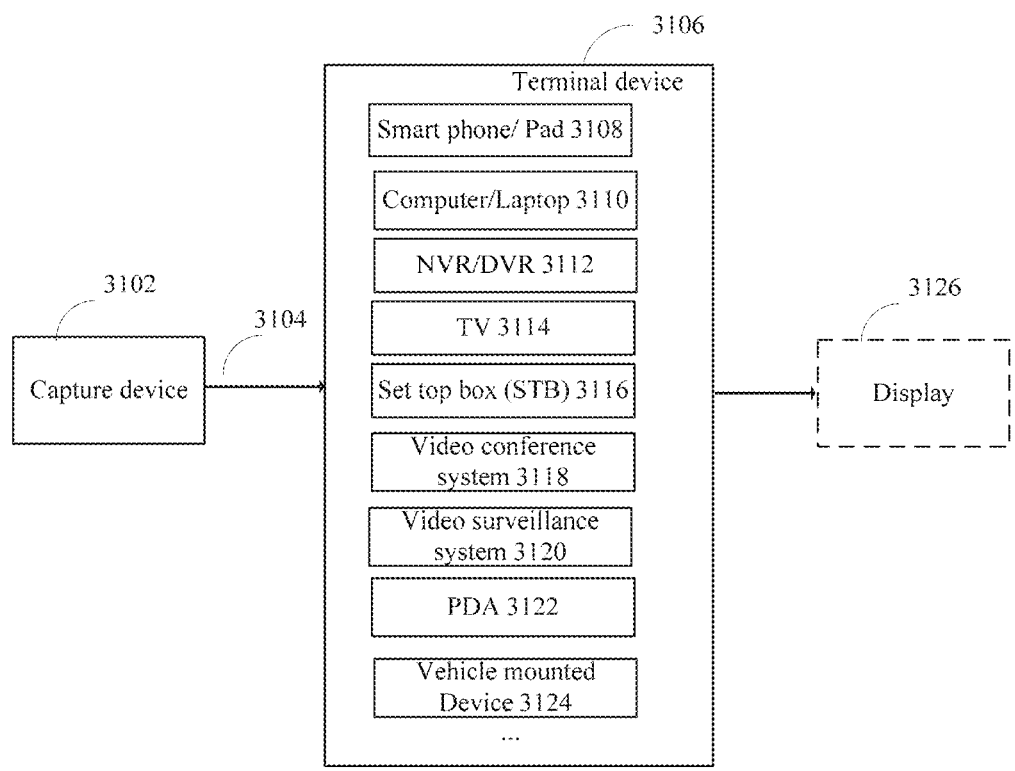
FIG. 27 is a block diagram showing an example structure of a content supply system which provides a content delivery service.

FIG. 27 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 28:
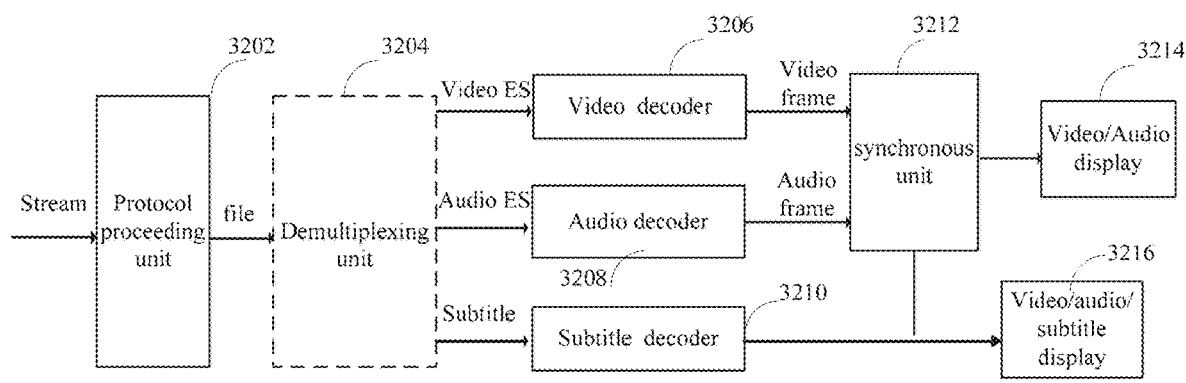
FIG. 28 is a block diagram showing a structure of an example of a terminal device.

FIG. 28 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of intra prediction of a block in a picture of a video, the method performed by a video encoder or a video decoder, the method comprising:
   obtaining an intra prediction mode of the block;
   determining the intra prediction mode of the block is a wide-angle mode;
   filtering reference samples for the block based, at least in part, upon determining that the intra prediction mode of the block is the wide-angle mode;
   generating predicted samples of the block based on the filtered reference samples; and
   performing position-dependent prediction combination (PDPC) for the filtered reference samples;
   when the wide angle mode is a top-right diagonal mode, PDPC weights wT and wL satisfy: wT=32>>((y'<<1)>>shift), wL=0; or
   when the wide angle mode is a bottom-left diagonal mode, PDPC weights wT and wL satisfy: wL=32>>((x'<<1)>>shift), wT=0;
   wherein wT is the weight for filtered reference samples located at the top of the block, wL is the weight for filtered reference samples located at the left of the block, (x', y') are coordinates of the predicted samples predSamples, and shift is a variable based on a size of the block.

2. The method of claim 1, wherein the intra prediction mode of the block is an integer slope wide-angle mode.

3. The method of claim 2, wherein a value indicating the integer slope wide-angle mode is at least one of:
   −14, −12, −10, −6, 72, 76, 78, or 80.

4. The method of claim 1, wherein a filter used to filter the reference samples is defined by coefficients [1, 2, 1]/4.

5. The method of claim 1, further comprising, when the intra prediction mode of the block is not the wide-angle mode:
- determining that a value indicating the intra prediction mode is one of 2, 34, or 66; and
- filtering the reference samples for the block based, at least in part, upon determining that the value indicating the intra prediction mode of the block is one of 2, 34, or 66.

6. The method of claim 1, further comprising: determining a filtered reference sample buffer will be used based on the intra prediction mode of the block being the wide-angle mode.

7. An apparatus for intra prediction of a block of a picture in a video, the apparatus comprises:
- a non-transitory computer-readable storage medium containing instructions; and
- one or more processors in communication with the non-transitory computer-readable storage medium and upon execution of the instructions, configured to:
  - obtain an intra prediction mode of the block;
  - determine the intra prediction mode of the block is a wide-angle mode;
  - filter reference samples for the block based, at least in part, upon determining that the intra prediction mode of the block is the wide-angle mode;
  - generate predicted samples of the block based on the filtered reference samples; and
  - perform position-dependent prediction combination (PDPC) for the filtered reference samples;
  - when the wide angle mode is a top-right diagonal mode, PDPC weights wT and wL satisfy: wT=32>>((y'<<1)>>shift), wL=0; or
  - when the wide angle mode is a bottom-left diagonal mode, PDPC weights wT and wL satisfy: wL=32>>((x'<<1)>>shift), wT=0;
  - wherein wT is the weight for filtered reference samples located at the top of the block, wL is the weight for filtered reference samples located at the left of the block, (x', y') are coordinates of the predicted samples predSamples, and shift is a variable based on a size of the block.

8. The apparatus of claim 7, wherein the intra prediction mode of the block is an integer slope wide-angle mode.

9. The apparatus of claim 8, wherein a value indicating the integer slope wide-angle mode is at least one of:
−14, −12, −10, −6, 72, 76, 78, or 80.

10. The apparatus of claim 7, wherein a filter used to filter the reference samples is defined by coefficients: [1, 2, 1]/4.

11. The apparatus of claim 7, wherein the one or more processors is further configured to:
- determine that a value indicating the intra prediction mode of the block is one of 2, 34, or 66 when the intra prediction mode of the block is not the wide-angle mode; and
- filter the reference samples for the block based, at least in part, upon determining that the value indicating the intra prediction mode of the block is one of 2, 34, or 66.

12. The apparatus of claim 7, wherein the apparatus is a video encoder or a video decoder.

13. The apparatus of claim 7, wherein the one or more processors are further configured to:
- determine a filtered reference sample buffer will be used based on the intra prediction mode of the block being the wide-angle mode.

14. A non-transitory storage medium comprising a bitstream of a video generated by an encoder or processed by a decoder, the bitstream of the video comprising:
- first information representing an intra prediction mode of a block of the video;
- second information representing residual of the block based on predicted samples of the block generated using filtered reference samples for the block, the filtered reference samples being generated by filtering reference samples for the block based, at least in part, upon the intra prediction mode of the block being a wide-angle mode; and
- the bitstream of the video further comprises information indicating position-dependent prediction combination (PDPC) is performed for the filtered reference samples for the block;
- when the wide angle mode is a top-right diagonal mode, PDPC weights wT and wL satisfy: wT=32>>((y'<<1)>>shift), wL=0; or
- when the wide angle mode is a bottom-left diagonal mode, PDPC weights wT and wL satisfy: wL=32>>((x'<<1)>>shift), wT=0;
- wherein wT is the weight for filtered reference samples located at the top of the block, wL is the weight for filtered reference samples located at the left of the block, (x', y') are coordinates of the predicted samples predSamples, and shift is a variable based on a size of the block.

15. The non-transitory storage medium of claim 14, wherein the intra prediction mode of the block is an integer slope wide-angle mode, and a value indicating the integer slope wide-angle mode is at least one of:
−14, −12, −10, −6, 72, 76, 78, or 80.

16. The non-transitory storage medium of claim 14, wherein a filter used to filter the reference samples is defined by coefficients: [1, 2, 1]/4.

17. The non-transitory storage medium of claim 14, wherein the bitstream of the video further comprises:
- third information representing residual of a second block of the video based on predicted samples of the second block generated using filtered reference samples for the second block, wherein the filtered reference samples are generated by filtering reference samples for the second block based, at least in part, upon an intra prediction mode of the second block being different from the wide-angle mode and a value indicating the intra prediction mode of the second block being one of 2, 34, or 66.

18. The non-transitory storage medium of claim 14, a filtered reference sample buffer being used based on the intra prediction mode of the block being a wide-angle mode.

* * * * *